United States Patent
Morishita et al.

(10) Patent No.: US 10,467,176 B2
(45) Date of Patent: Nov. 5, 2019

(54) INFORMATION PROCESSING APPARATUS

(71) Applicant: Hitachi, Ltd., Tokyo (JP)

(72) Inventors: Satoshi Morishita, Tokyo (JP);
Mitsuhiro Okada, Tokyo (JP);
Akifumi Suzuki, Tokyo (JP); Shimpei Nomura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/545,461

(22) PCT Filed: Feb. 25, 2015

(86) PCT No.: PCT/JP2015/055345
§ 371 (c)(1),
(2) Date: Jul. 21, 2017

(87) PCT Pub. No.: WO2016/135875
PCT Pub. Date: Sep. 1, 2016

(65) Prior Publication Data
US 2018/0011812 A1    Jan. 11, 2018

(51) Int. Cl.
| | | |
|---|---|---|
| *G06F 13/42* | (2006.01) | |
| *G06F 3/06* | (2006.01) | |
| *G06F 13/00* | (2006.01) | |
| *G06F 13/10* | (2006.01) | |
| *G06F 13/12* | (2006.01) | |

(Continued)

(52) U.S. Cl.
CPC .......... *G06F 13/4221* (2013.01); *G06F 3/067* (2013.01); *G06F 3/0613* (2013.01); *G06F 3/0635* (2013.01); *G06F 3/0658* (2013.01); *G06F 12/0215* (2013.01); *G06F 13/00* (2013.01); *G06F 13/10* (2013.01); *G06F 13/12* (2013.01); *G06F 13/126* (2013.01);

(Continued)

(58) Field of Classification Search
None
See application file for complete search history.

(56) References Cited

U.S. PATENT DOCUMENTS

| | | |
|---|---|---|
| 5,247,665 A | 9/1993 | Matsuda et al. |
| 2008/0071961 A1* | 3/2008 | Higuchi ............... G06F 11/2017 710/312 |

(Continued)

FOREIGN PATENT DOCUMENTS

JP          2-178773 A          7/1990

OTHER PUBLICATIONS

International Search Report of PCT/JP2015/055345 dated May 19, 2015.

(Continued)

*Primary Examiner* — Michael Sun
(74) *Attorney, Agent, or Firm* — Mattingly & Malur, PC

(57) ABSTRACT

An information processing device having a processor and memory, and including one or more accelerators and one or more storage devices, wherein: the information processing device has one network for connecting the processor, the accelerators, and the storage devices; the storage devices have an initialization interface for accepting an initialization instruction from the processor, and an I/O issuance interface for issuing an I/O command; and the processor notifies the accelerators of the address of the initialization interface or the address of the I/O issuance interface.

1 Claim, 21 Drawing Sheets

(51) Int. Cl.
*G06F 13/14* (2006.01)
*G06F 12/02* (2006.01)
*G06F 13/40* (2006.01)

(52) U.S. Cl.
CPC .......... *G06F 13/14* (2013.01); *G06F 13/4022* (2013.01); *G06F 2213/0026* (2013.01)

(56) References Cited

U.S. PATENT DOCUMENTS

| | | | |
|---|---|---|---|
| 2012/0019674 A1* | 1/2012 | Ohnishi | G08C 17/00 348/207.1 |
| 2013/0007412 A1* | 1/2013 | Krishnamurthy | G06F 15/76 712/30 |
| 2013/0013921 A1* | 1/2013 | Bhathena | H04L 9/0825 713/168 |
| 2013/0151747 A1 | 6/2013 | Zhang et al. | |
| 2014/0129753 A1 | 5/2014 | Schuette et al. | |
| 2014/0164688 A1* | 6/2014 | Lee | G06F 12/08 711/104 |
| 2014/0189332 A1* | 7/2014 | Ben-Kiki | G06F 9/30145 712/244 |
| 2015/0269074 A1* | 9/2015 | Shah | G06F 12/084 711/130 |
| 2017/0070892 A1* | 3/2017 | Song | H04L 41/042 |
| 2018/0011812 A1* | 1/2018 | Morishita | G06F 12/0215 |

OTHER PUBLICATIONS

Japanese Office Action received in corresponding Japanese Application No. 2018-080523 dated Mar. 12, 2019.
Matsuda et al., "A Database Operation Processor:DBE", Information Processing, Information Processing Society of Japan, Dec. 15, 1992, vol. 33 No. 12 , pp. 1424-1430, Japan.

* cited by examiner

|  |  | FPGA | | |
|---|---|---|---|---|
|  |  | 500 | 510 | 520 |
| STORAGE DEVICE | 400 | 1 | 3 | 1 |
|  | 410 | 3 | 1 | 3 |
|  | 420 | 1 | 3 | 1 |
|  | 430 | 1 | 3 | 1 |

*FIG. 8*

INFORMATION PROCESSING APPARATUS

BACKGROUND

This invention relates to an information processing apparatus configured to process an I/O command.

In recent years, technologies of rapidly analyzing a large amount of data have attracted attention for business utilization. In general, a host processor (hereinafter also referred to as "processor") of a server reads data from a storage device, for example, a hard disk drive (HDD), and analyzes or operates the data.

A solid state drive (SDD), which has a flash memory as its storage medium and can be accessed more rapidly than the HDD, is becoming popular for use as the storage device. Further, semiconductor storage media such as a resistance random access memory (ReRAM) and a phase change memory (PCM), which can be accessed more rapidly than the flash memory, are increasingly put into practical use.

The rise of such storage devices has enabled a large amount of data to be read rapidly. However, bottlenecks such as high processing loads on the processor and the bandwidth of a bus coupled to the processor cause time consumption in data transfer. As a result, the performance of such rapid storage devices cannot be fully utilized, leading to a failure to speed up the information processing apparatus.

Hitherto, there has been known a technology of incorporating an apparatus (hereinafter referred to as "accelerator") having an arithmetic function into the information processing apparatus and distributing a part of processing, which is executed by the processor normally, to that accelerator. For example, there is known a technology of incorporating, as the accelerator, a graphics processing unit (GPU) into a server having a processor and causing the GPU to process a part of program processing, which is executed by the processor normally, to thereby improve a processing speed.

This technology involves a large amount of data transfer in that the processor transfers data to be processed from the storage device to a system memory coupled to the processor and the processor further transfers the data from the system memory to the accelerator, to thereby enable the GPU to process the data. In particular, the data flows through a bus coupled to the processor frequently, and thus the bandwidth of the bus sometimes becomes a bottleneck for performance improvement.

In order to resolve the data transfer bottleneck, in US 2014/0129753 A1, there is disclosed an information processing apparatus in which the accelerator and the storage device directly communicate to/from each other without intervention of the processor to further improve the processing speed.

In the technology of US 2014/0129753 A1, a pair of a GPU and a non-volatile memory array is mounted on a board, the board is coupled to an information processing apparatus including a processor and a system memory, and the GPU and the non-volatile memory array directly transfer data to/from each other. The data of the non-volatile memory array is transferred to the GPU, and only the result of processing by the GPU is transferred to a bus coupled to the processor. Thus, it is possible to prevent access to the system memory from limiting the bandwidth of the bus.

SUMMARY

In US 2014/0129753 A1, there is no description of how the GPU identifies a non-volatile memory array to be accessed at the time of initialization of the information processing apparatus. There is a problem in that, when the storage device and the accelerator are coupled to interfaces as endpoints of PCI-Express (hereinafter referred to as "PCIe"), the accelerator cannot identify an address of a command interface of the storage device to be accessed. This leads to a problem in that, when the accelerator cannot identify the address of the command interface of the storage device, the accelerator cannot access the storage device for a data read and execute a part of the processing of the processor.

In view of the above, it is an object of this invention to provide an information processing apparatus in which an accelerator identifies a storage device, reads data from the storage device, and executes a part of processing of a processor.

A representative aspect of the present disclosure is as follows. An information processing apparatus, comprising: a processor; a memory; at least one accelerator; at least one storage device; and a network configured to couple the processor, the at least one accelerator, and the at least one storage device to one another, wherein the at least one storage device comprises: an initial setting interface configured to receive an initialization instruction from the processor; and an I/O interface configured to issue an I/O command, and wherein the processor is configured to notify the at least one accelerator of one of an address of the initial setting interface and an address of the I/O interface.

According to this invention, the accelerator can identify the address of the command interface of the storage device, read the data from the storage device, and execute a part of the processing of the processor, to thereby speed up the processing of the information processing apparatus.

BRIEF DESCRIPTION OF THE DRAWINGS

FIG. 8 is a hop count table for showing the number of hops between the storage devices and the accelerator boards according to the first embodiment of this invention.

DETAILED DESCRIPTION OF THE PREFERRED EMBODIMENTS

Embodiments of this invention are described below with reference to the accompanying drawings.

First, a description is given of an information processing apparatus 10 configured to perform database processing (hereinafter also referred to as "DB processing") as an outline of this invention.

Figure 1:
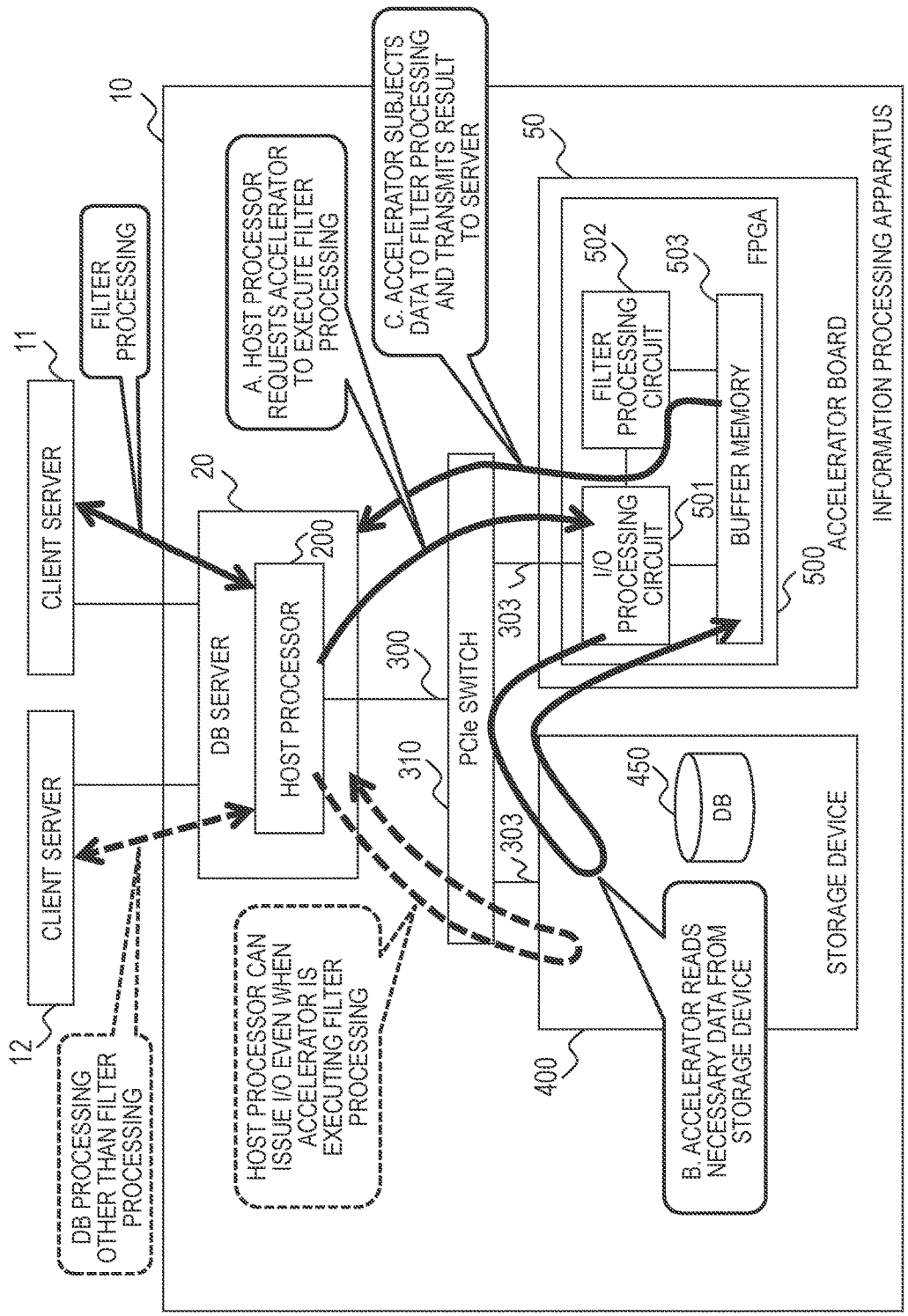
FIG. 1 is a block diagram for illustrating a concept according to a first embodiment of this invention.

FIG. 1 is a block diagram for illustrating a concept of this invention. FIG. 1 is a computer system including an information processing apparatus 10 having an accelerator board 50 for offloading filter processing of database processing mounted thereon, and client servers 11 and 12 configured to use the information processing apparatus 10.

The filter processing is processing of comparing a subject database (hereinafter also referred to as "DB") with a conditional expression and extracting data that matches the conditional expression. Offloading to the accelerator board 50 works effectively for the filter processing because high loads are imposed on a host processor 200 of the information processing apparatus 10 especially when the conditional expression is complex or when the data amount of the subject DB is large.

Components such as a field programmable gate array (hereinafter referred to as "FPGA"), a graphics processing unit (hereinafter referred to as "GPU"), and a sub-processor are mounted on the accelerator board 50. The accelerator board 50 is usually mounted on, for example, a board having a PCIe interface, and used in the information processing apparatus 10 as an accelerator.

The information processing apparatus 10 of FIG. 1 includes a database server 20 (hereinafter referred to as "DB server") including the host processor 200 (hereinafter also referred to as "processor") configured to perform database processing, a storage device 400 configured to store a database 450 (hereinafter also referred to as "DB"), and the accelerator board 50 having an FPGA 500 capable of offloading processing of the host processor 200 mounted thereon. The database processing is processing to be performed by, for example, a database management system (DBMS).

The host processor 200, the storage device 400, the accelerator board 50, and the FPGA 500 are mutually coupled to one another via a PCIe switch 310 using PCIe buses 300 and 303. The accelerator board 50 and the FPGA 500 are mapped to a memory space of the DB server 20 (host processor 200), and those components can communicate to/from one another using addresses based on the memory mapping. This configuration is referred to as "one network".

The FPGA 500 includes an I/O processing circuit 501 having a function of receiving access from the host processor 200 and a function of issuing an I/O from the FPGA 500 (specifically, PCIe endpoint function and control function of PCIe endpoint), a filter processing circuit 502 capable of rapidly executing filter processing, and a buffer memory 503 configured to temporarily store data of the DB 450. Those components are coupled to one another via an internal bus.

The I/O processing circuit 501 and the filter processing circuit 502 may both be implemented as hardware circuits of the FPGA 500, or a part or all of the functions of those circuits may be implemented by a processor embedded in the FPGA 500. Further, in the embodiments, a description is given using the FPGA 500 as the accelerator board 50, but a GPU or a sub-processor may be employed.

The client servers 11 and 12 are servers configured to operate applications for using the DB 450 managed by the information processing apparatus 10, and request the DB server 20 to perform DB processing.

Now, operations A to C are described as a procedure of the DB server 20 receiving an instruction to use the filter processing from the client servers 11 and 12 and offloading the filter processing to the FPGA 500.

The host processor 200 of the DB server 20 issues a command for instructing execution of the filter processing to the FPGA 500(A). The I/O processing circuit 501 of the FPGA 500, which has received the command, issues a read command to the storage device 400, acquires data of the DB 450 to be subjected to the filter processing, and stores the acquired data into the buffer memory 503 of the FPGA 500(B).

Next, the filter processing circuit 502 reads from the buffer memory 503 the data of the DB 450 read by the I/O processing circuit 501, performs the filter processing on the data, and transmits the result of filter processing to the DB server 20 as result data (C).

Through the filter processing performed in such a procedure, data of the DB 450 does not flow through a bus 300 coupled to the DB server 20, and only the command and result data flow through the bus 300. Therefore, it is possible to reduce the amount of data flowing through the bus 300 compared to the related-art procedure.

In other cases, the plurality of client servers 11 and 12 can be coupled to the information processing apparatus 10, and thus, for example, while the client server 11 is requesting the filter processing, another client server 12 may request DB processing (e.g., update processing) other than the filter processing.

In this case, the host processor 200 needs to make I/O access to the storage device 400, and the host processor 200 can issue an I/O to the storage device 400 even while the FPGA 500 is executing the filter processing. Thus, the information processing apparatus 10 can execute a plurality of pieces of processing in parallel, and transmit the result of requested processing to the client servers 11 and 12.

First Embodiment

Next, a description is given of a first embodiment of this invention in detail with reference to FIG. 2 to FIG. 6.

Figure 2:
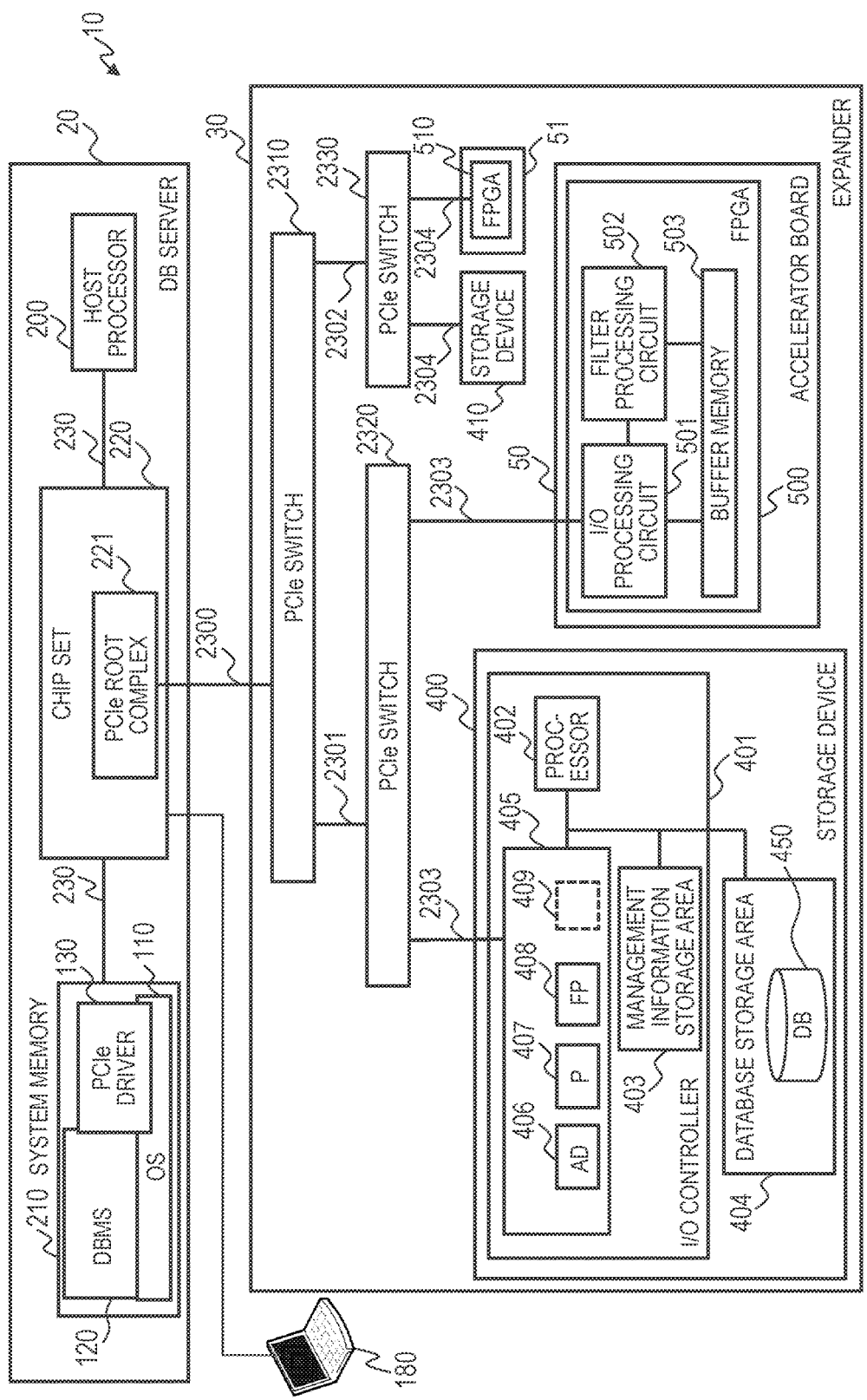
FIG. 2 is a block diagram for illustrating an example of a configuration of the information processing apparatus according to the first embodiment of this invention.

FIG. 2 is a block diagram for illustrating an example of a configuration of the information processing apparatus 10 to which this invention is applied.

The information processing apparatus 10 includes the DB server 20 and an expander 30. The DB server 20 includes the processor 200, a system memory 210, and a chip set 220, and those components are coupled to one another via an internal bus 230. A PCIe root complex 221 functions in the chip set 220, and is coupled to a PCIe switch 2310 via a PCIe bus 2300.

A terminal 180 including an input apparatus and an output apparatus (e.g., display) is coupled to the chip set 220. An OS 110, a PCIe driver 130, and a DBMS 120 are loaded into the system memory 210 for execution by the host processor 200.

The PCIe driver 130 is configured to control the storage device or the accelerator coupled to the PCIe network. The PCIe driver 130 may be included in the OS 110. The DBMS 120 accesses apparatus coupled to the PCIe bus 2300 via the PCIe driver 130.

The expander 30 includes two storage devices 400 and 410, two accelerator boards 50 and 51, and PCIe switches 2310, 2320, and 2330, and those components are coupled to the DB server 20 via PCIe buses 2300 to 2304.

The storage device 400 and the accelerator board 50 are coupled to the PCIe switch 2320 via the PCIe bus 2303. The PCIe switch 2320 is coupled to the PCIe switch 2310 via the PCIe bus 2301.

Similarly, the storage device 410 and the accelerator board 51 are coupled to the PCIe switch 2330 via the PCIe bus 2304. The PCIe switch 2330 is coupled to the PCIe switch 2310 via the PCIe bus 2302.

The configuration as illustrated in FIG. 2 is also one network because the accelerator boards 50 and 51 and the storage devices 400 and 410 are mapped to the memory space of the DB server 20. The PCIe bus is used in the first embodiment, and thus is referred to as "PCIe network". In this manner, "one network" is not limited to the configuration of FIG. 1 in which the storage device 400 and the accelerator board 50 have one PCIe switch 310. Even when there are a plurality of switches such as the PCIe switches 2310, 2320, and 2330 of FIG. 2, it suffices that the storage devices and accelerator boards are mapped to the memory space of the DB server 20 (host processor 200).

The accelerator boards 50 and 51 have FPGAs 500 and 510 mounted thereon. The FPGA 500 includes the I/O processing circuit 501, the filter processing circuit 502, and the buffer memory 503, and those components are coupled to one another. Although not shown, the FPGA 510 also has a configuration similar to that of the FPGA 500.

The storage device 400 is a storage device capable of performing communication via a non-volatile memory (NVM) express (hereinafter referred to as "NVMe") protocol, and includes an I/O controller 401 and a database storage area 404. The database storage area 404 stores the DB 450. The database storage area 404 can be formed of a non-volatile storage medium such as a flash memory, a resistance random access memory (ReRAM), or a phase change memory (PCM). Although not shown, the storage device 410 has a configuration similar to that of the storage device 400.

The database storage area 404 of the storage device 400 is not directly mapped to the memory space of the DB server 20 (host processor 200), and only the command interface is mapped thereto. The host processor 200 or the FPGA 500 cannot access the database storage area 404 directly using the PCIe buses 2300 to 2304. Thus, the host processor 200 or the accelerator board 50 issues an I/O command (write command/read command) to the storage device 400 to write/read data to/from the database storage area 404.

In other words, in the system memory 210, the OS 110 assigns memory elements of the system memory 210 to the address space for access management. In contrast, in the NVMe or SATA, the database storage area 404 is managed in units of blocks, but all the blocks are not assigned to the address space (logical block) of the system memory 210, and access is made through exchange of commands.

The I/O controller 401 is configured to receive an I/O command from outside the storage devices 400 and 410, and perform the following processing in accordance with the command. When the command is a read command, the I/O controller 401 reads data of the corresponding read address from the database storage area 404, and writes the data into an address that has requested the data read. When the command is a write command, the I/O controller 401 reads write data from an address that is a transmission source of the write data, and stores the write data into a space of the database storage area 404 corresponding to the write address.

The I/O controller 401 includes a processor 402 configured to perform arithmetic processing, a command interface 405 containing a plurality of queues, and a management information storage area 403 for storing information necessary for performing processing.

The command interface 405 includes an admin queue 406 for receiving an admin command, which is used mainly at the time of initialization (e.g., function of generating (or enabling) an I/O queue in NVMe) or at the time of occurrence of an error, a host-processor dedicated I/O queue 407 (hereinafter referred to as "processor queue") for receiving an I/O command from the host processor 200, and an FPGA dedicated I/O queue 408 (hereinafter referred to as "FPGA queue") for receiving an I/O command from the FPGA 500. In the following, the processor queue 407 and the FPGA queue 408 are collectively referred to as "I/O queue".

Those I/O queues are mapped to the address space (MMIO space) of the PCIe network as the command interface 405 together with registers for management of the storage device 400.

The admin queue 406, the processor queue 407, and the FPGA queue 408 are independent queues having different addresses assigned thereto. Those addresses of the admin queue 406, the processor queue 407, and the FPGA queue 408 are assigned to the command interface 405 of the storage device in the address space of the PCIe network. The OS 110 or the PCIe driver 130 operating in the DB server 20 can assign addresses in the address space of the PCIe network.

When the host processor 200 of the DB server 20 or the FPGA 500 uses those I/O queues to issue an I/O command, the processor 402 of the storage device 400 that has detected the I/O command performs I/O command processing such as data write or data read.

The I/O queue is not enabled in the storage device 400 at the time of its power activation, and only the admin queue 406 is enabled. The host processor 200 issues an instruction to generate (or initialize or enable) an I/O queue to the admin queue 406, and thus the processor 402 that has received the instruction enables the processor queue 407, for example.

Then, the processor 402 transmits a notification to the host processor 200 of the DB server 20 to the effect that the processor queue 407 is generated (or enabled), and the host processor 200 can use the processor queue 407.

In this description, enabling of the I/O queues 407 and 408 through use of the admin queue 406 is referred to as "generation of I/O queue". The storage device 400 prepares a plurality of I/O queues, and information on whether or not those plurality of I/O queues are enabled or disabled is stored in the management information storage area 403 (e.g., volatile storage medium such as DRAM or non-volatile storage medium such as flash memory, ReRAM, or PCM) of the I/O controller 401.

The admin queue 406 functions as an initial setting interface for receiving an initialization instruction from the host processor 200 and generating and managing the I/O queues 407 and 408. Further, the I/O queues 407 and 408 function as I/O interfaces configured to receive I/O commands from the host processor 200 and the FPGA 500.

In FIG. 2, the storage device 400 has the three I/O queues 407 to 409, and assigns the processor queue 407 and the FPGA queue 408 to the host processor 200 and the FPGA 500, respectively, to enable those queues, whereas the I/O queue 409 is disabled.

The disabled I/O queue 409 can be assigned to another processor or FPGA. For example, the host processor 200 may be a dual-core processor with the processor queue 407 assigned to one core and the I/O queue 409 assigned to the other core so as to enable each core to issue an I/O without exclusive processing between those cores. Alternatively, the FPGA queue 408 and the I/O queue 409 may be assigned to the FPGAs 500 and 510, respectively, so as to enable the plurality of FPGAs to issue I/O instructions to one storage device 400.

In FIG. 2, the storage device 400 has three I/O queues, but may have any other numbers of I/O queues.

Figure 3:
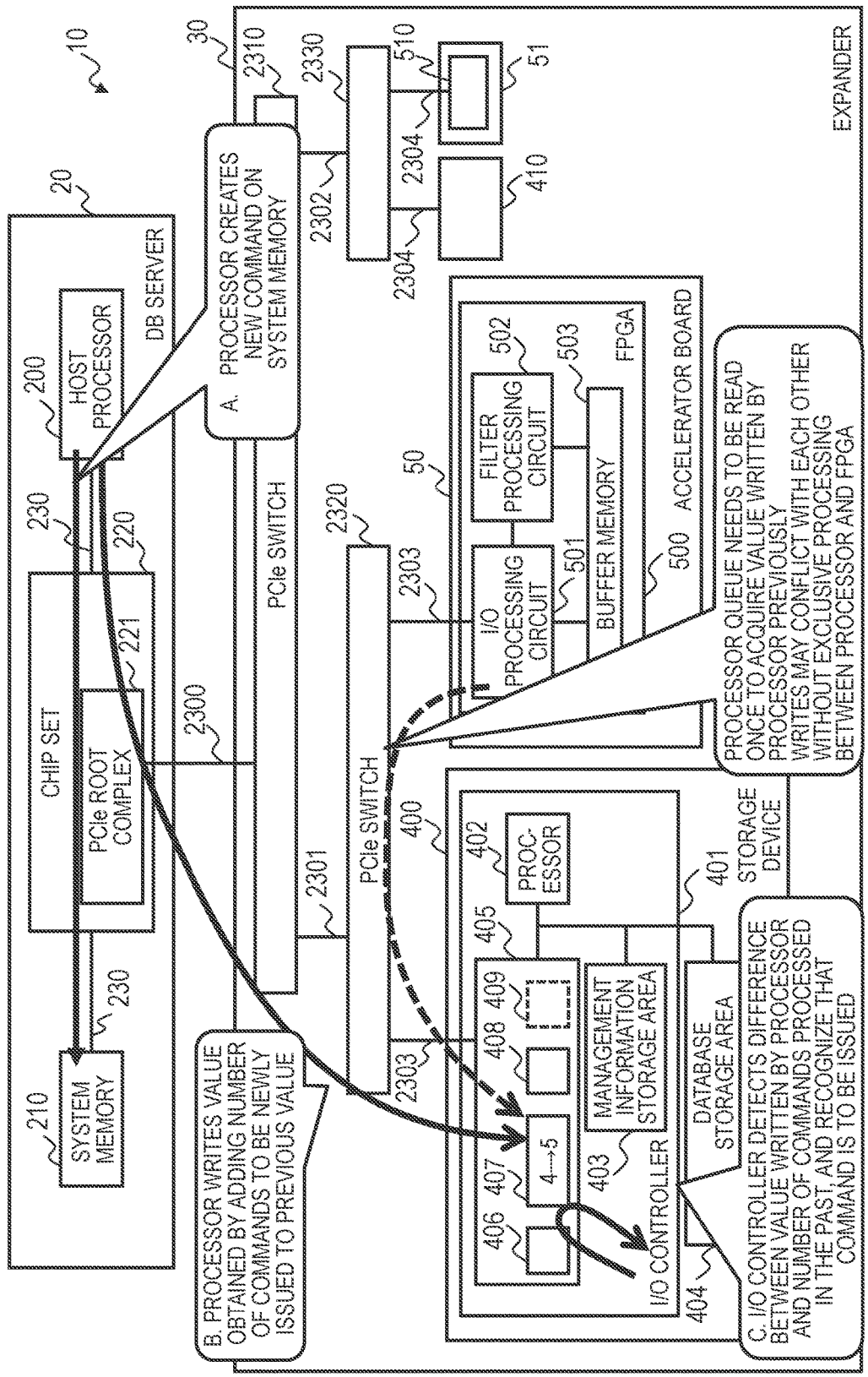
FIG. 3 is an explanatory diagram for illustrating a case in which the information processing apparatus performs I/O processing according to the first embodiment of this invention.

FIG. 3 is an explanatory diagram for illustrating a case in which the information processing apparatus 10 performs I/O processing. Now, a necessity of preparing I/O queues separately for the host processor 200 and the FPGA 500 is described with reference to FIG. 3.

For example, in the technology of NVMe, the processor queue 407 of the storage device 400 is formed of a register to which the host processor 200 writes data, and the accumulated number of I/O commands that the host processor 200 has issued so far is written thereto.

The I/O command issued by the host processor 200 can be stored into the management information storage area 403 of the I/O controller 401. Alternatively, the I/O command issued by the host processor 200 may be stored into a predetermined area of the system memory 210. Technologies of widely known art or publicly known art may be used to determine where the I/O command issued by the host processor 200 is stored, and thus a detailed description is not given in the first embodiment.

Meanwhile, the processor 402 of the storage device 400 stores the number of commands processed in the past in the management information storage area 403. For example, when the value of the processor queue 407 and the value of the management information storage area 403 are both 4, it means that the host processor 200 issued four commands in the past, and the storage device 400 has finished processing all those four commands.

Now, a description is given of processing of the host processor 200 newly issuing an I/O command to the storage device 400 using operations A to C of FIG. 3. First, the host processor 200 generates an I/O command to a predetermined address of the system memory 210(A).

Next, the host processor 200 adds 1 to the current value "4" to obtain a value "5", and writes the value into the processor queue 407(B).

Meanwhile, the processor 402 of the I/O controller 401 detects that there is a difference between the value "5" of the processor queue 407 and the value of the number of commands "4" processed in the past, which is stored in the management information storage area 403, to determine that there is a new command, and acquires a command from the system memory 210(C).

The host processor 200 can store the value written to the processor queue 407 by itself. Thus, when the host processor 200 issues a next I/O, the host processor 200 can easily write a value obtained by adding 1 to the previous value without reading the processor queue 407, thereby being capable of issuing a command quickly.

In this case, assuming that the FPGA 500 shares the processor queue 407 with the host processor 200 and newly issues an I/O command, the FPGA 500 first needs to read the processor queue 407 to know the current value.

Further, there is a necessity of exclusive processing between the FPGA 500 and the host processor 200, for example, instructing the host processor 200 not to update the processor queue 407. Those matters cause a problem in that the overall performance of the information processing apparatus 10 deteriorates because a larger amount of time is consumed compared to usual I/O issuance of the host processor 200 and the host processor 200 cannot issue an I/O command for some period.

In contrast, the storage device 400 of the first embodiment generates the processor queue 407 for the host processor 200 and the FPGA queue 408 for the FPGA 500. In this manner, when the I/O controller 401 has separate I/O queues for the host processor 200 and the FPGA 500, the processor 200 and the FPGA 500 do not need to perform exclusive processing and additional reading of I/O queues, and thus the host processor 200 and the FPGA 500 can both issue an I/O command quickly.

Figure 4:
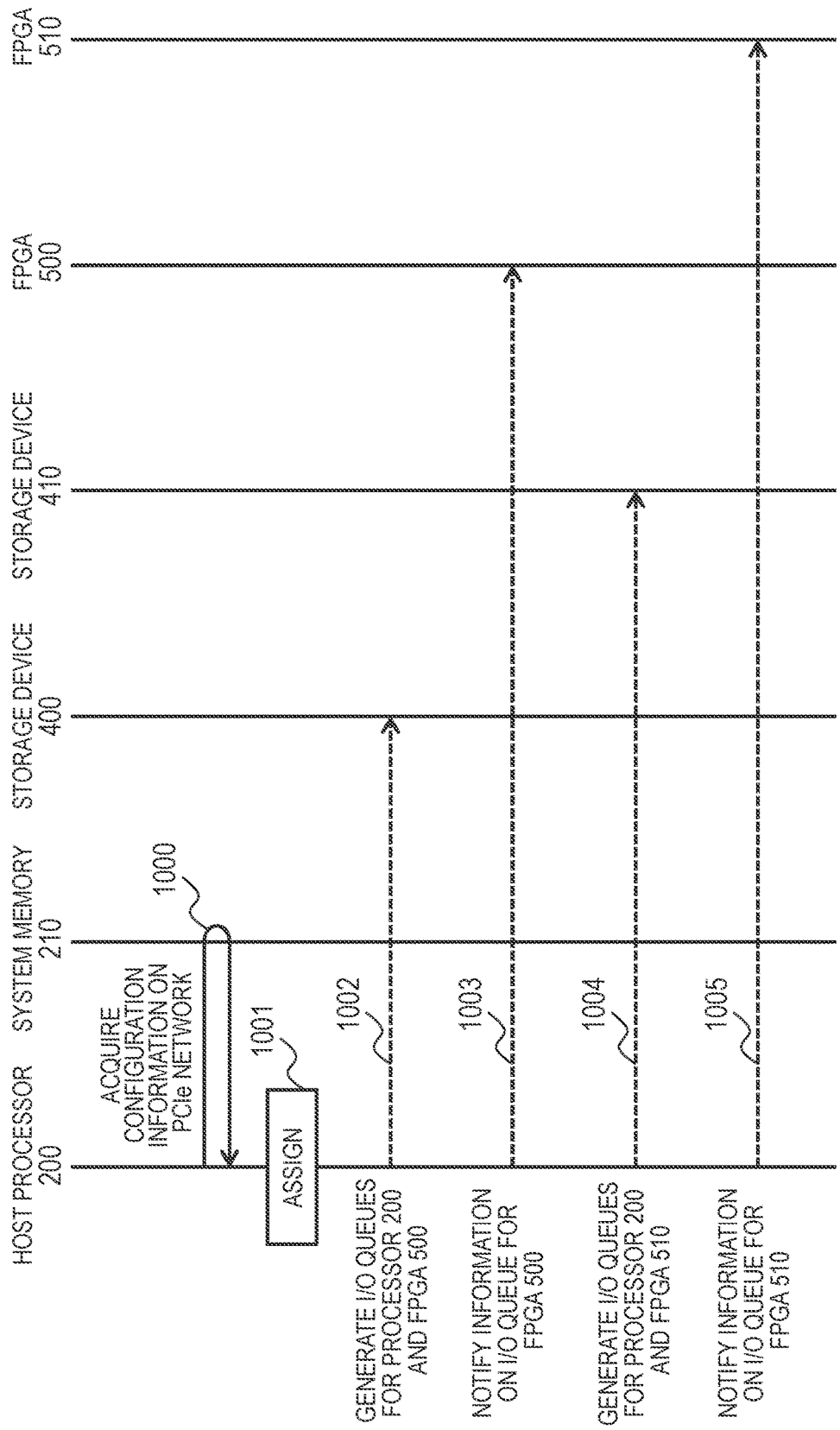
FIG. 4 is a sequence diagram for illustrating an example of initialization processing to be performed by the information processing apparatus according to the first embodiment of this invention.

FIG. 4 is a sequence diagram for illustrating an example of initialization processing to be performed by the information processing apparatus 10.

At the start of initialization of the information processing apparatus 10, the host processor 200 acquires from the system memory 210 configuration information on the PCIe network to which the host processor 200 is coupled (1000). Further, the initialization processing of the first embodiment is executed by the OS 110 and the PCIe driver 130 loaded into the system memory 210. In the following, a description is given on the assumption that the host processor 200 performs processing of the OS 110 and the PCIe driver 130.

In the PCIe network, the chip set 220 having the PCIe root complex 221 detects the network configuration of PCIe endpoint devices coupled to the chip set 220 at the time of activation, and stores the detection result (e.g., PCI device tree) into a predetermined area of the system memory 210. The host processor 200 can access the predetermined area of the system memory 210 to acquire the stored configuration information on the PCIe network (or bus).

The configuration information on the PCIe network may contain, for example, positions of devices on the network (or bus), performance of the devices, and capacities of the devices. The host processor 200 collects the configuration information on the PCIe network at the time of activation of the OS 110 or the PCIe driver 130, and stores the configuration information into the predetermined area of the system memory 210.

Next, the host processor 200 uses the acquired configuration information on the PCIe network to assign the storage devices 400 and 410 to the accelerator boards 50 and 51, respectively, for access (1001). The information to be used for assignment is, for example, information on distances between the storage devices 400 and 410 and the accelerator boards 50 and 51. The processing of assigning the storage devices 400 and 410 to the accelerator boards 50 and 51 can be performed mainly by the PCIe driver 130 or the OS 110. In the following, a description is given on the assumption that the host processor 200, which executes the PCIe driver 130 and the OS 110, performs assignment.

For example, the number of hops of the PCIe network can be used as the information on distances. In the first embodiment, the number (or count) of PCIe switches 2310, 2320, and 2330 through which data passes is configured as the number of hops.

Data passes through one PCIe switch 2320 in communication between the FPGA 500 and the storage device 400, and thus the number of hops is 1. Meanwhile, data passes through the PCIe switches 2310, 2320, and 2330 in communication between the FPGA 510 and the storage device 400, and thus the number of hops is 3. As a result, in the configuration of FIG. 2, the storage device 400 is assigned to the FPGA 500 having a smaller number of hops. Through similar comparison of the information on distances, the storage device 410 is assigned to the FPGA 510.

The assignment of the storage device 400 to the accelerator board 50 is not limited to one-to-one correspondence. For example, the host processor 200 may assign the storage device 400 to both of the FPGA 500 and the FPGA 510, or may assign both of the storage device 400 and the storage device 410 to the FPGA 500.

Next, the host processor 200 transmits an instruction to generate an I/O queue to the storage device 400 (1002). The host processor 200 coupled to the PCIe root complex 221 can acquire an address of the admin queue 406 possessed by the I/O controller 401 of the storage device 400. Meanwhile, as described in the above-mentioned problem, the FPGA 500 serving as a PCIe endpoint cannot acquire the address of the admin queue 406 also serving as a PCIe endpoint.

Thus, the host processor 200 uses the admin queue 406 of the storage device 400 to generate two queues, namely, the processor queue 407 with which the host processor 200 issues an I/O command to the storage device 400 and the FPGA queue 408 with which the FPGA 500 issues an I/O command to the storage device 400 (1002).

Next, the host processor 200 notifies the FPGA 500 of the queue information (address of FPGA queue 408 and maximum number of commands to be simultaneously issued (depth of queue)) on the FPGA queue 408 (1003).

In this manner, when there are at least information on the address of the FPGA queue 408 and the depth of the queue, the FPGA 500 can issue an I/O command to the storage device 400. Further, the queue information may contain information such as the address of a PCIe (or PCI) configuration register (not shown) of the storage device 400 or the range (e.g., top accessible logical block address (LBA) and capacity) of accessible LBAs.

For example, when the FPGA 500 can acquire the address of the PCIe configuration register of the storage device 400, the FPGA 500 can also acquire the address of the NVMe register (not shown) of the storage device 400. The FPGA 500 can calculate the range of accessible LBAs from those addresses. The FPGA 500 can use the range of accessible LBAs to determine to which storage device to issue an I/O command, for example, when the plurality of storage devices 400 and 410 are assigned to one accelerator board 50.

The NVMe register is, for example, a register described in pp. 37-45 of "NVM Express" (Revision 1.1b Jul. 2, 2014, released by NVM Express Workgroup).

Further, the host processor 200 uses the admin queue to generate a processor queue and a FPGA queue for the storage device 410 in the same manner (1004), and notifies the FPGA 510 of information on the FPGA queue (1005).

In this manner, through the processing of FIG. 4, the FPGA 500 can issue an I/O command to the storage device 400, and the FPGA 510 can issue an I/O command to the storage device 410.

The description given above is based on the example of the host processor 200 using the admin queue 406 to generate the processor queue 407 and the FPGA queue 408, but the host processor 200 may notify the FPGA 500 of the address of the admin queue 406 and the FPGA 500 may generate the processor queue 407 and the FPGA queue 408.

In this manner, through the processing of FIG. 3 and FIG. 4, the FPGA 500 of the accelerator board 50 coupled to the PCIe network as an endpoint of the PCIe network can acquire queue information on the FPGA queue 408 from the host processor 200. With this, the FPGA 500 serving as a PCIe endpoint can issue an I/O command to the storage device 400 also serving as a PCIe endpoint, and the accelerator board 50 can access data of the DB 450 stored in the storage device 400.

Figure 5:
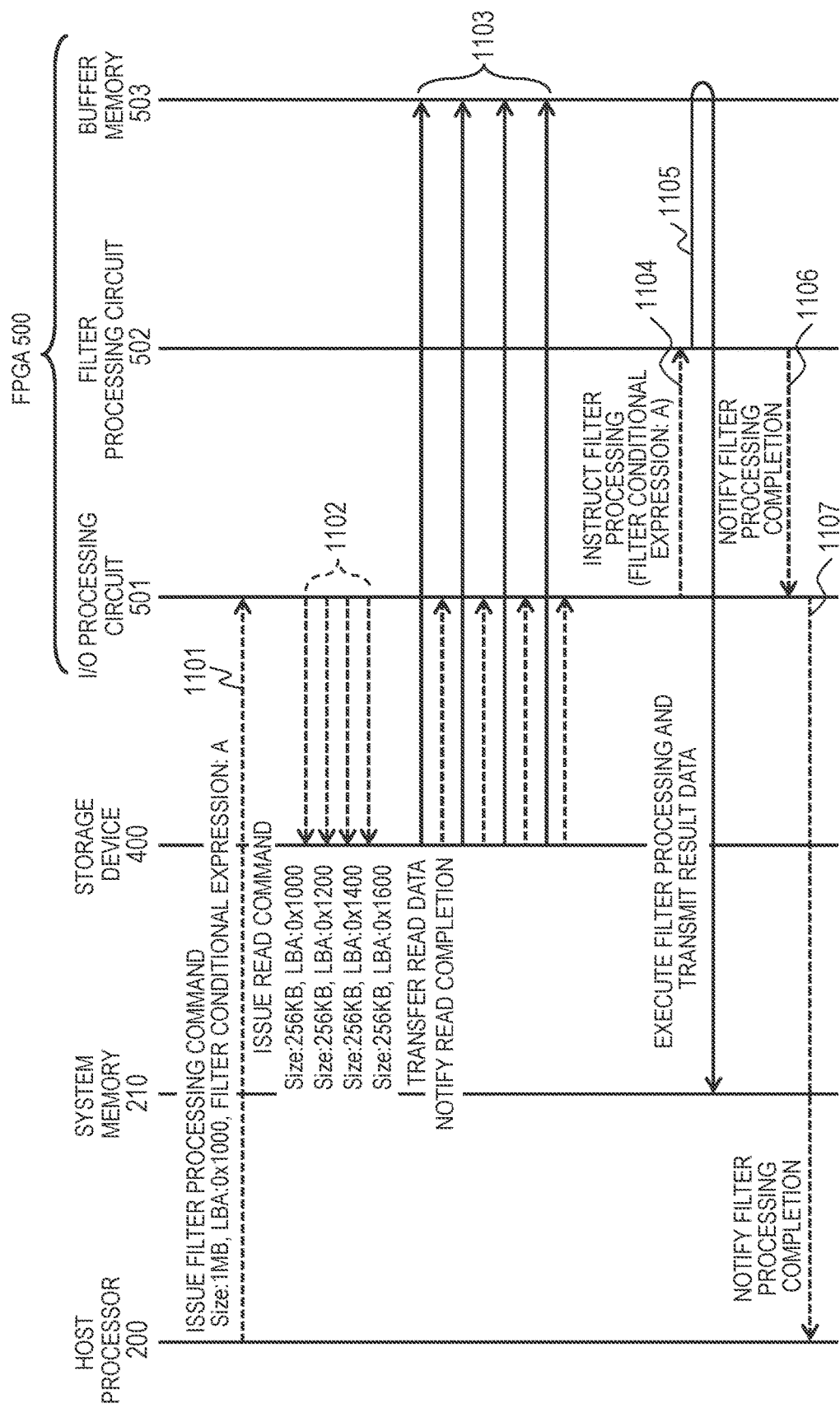
FIG. 5 is a sequence diagram for illustrating an example of the host processor causing the FPGA to execute filter processing for the database after completion of initialization of the information processing apparatus according to the first embodiment of this invention.

FIG. 5 is a sequence diagram for illustrating an example of the host processor 200 causing the FPGA 500 to execute filter processing for the database 450 after completion of initialization of the information processing apparatus 10.

The host processor 200, which executes the DBMS 120, first issues a filter processing command for instructing filter processing to the FPGA 500 (1101). This filter processing command at least contains information on which address of the DB storage area 404 of the storage device 400 indicates the top of a table of the database 450 to be subjected to the filter processing, information on the size of the DB 450 to be subjected to the filter processing, and a conditional expression A of the filter processing. In addition, the filter processing command may contain an address of the system memory 210 for storing resultant data of the filter processing.

The filter processing command is a command containing, for example, information indicating that the top of the table is LBA=0x1000 of the storage device 400 and 1-megabyte data is subjected to filter processing having a filter conditional expression A.

Further, any one of the DBMS 120 and the PCIe driver 130 may determine to which of the FPGA 500 and the FPGA 510 to issue a filter processing command. When the PCIe driver 130 makes the determination, the DBMS 120 issues a filter processing command to cause the PCIe driver 130 to determine to which of the FPGA 500 and the FPGA 510 to issue a filter processing command, and transmits the filter processing command.

The I/O processing circuit 501 of the FPGA 500, which has received the filter processing command from the host processor 200 executing the DBMS 120, issues a read command to the storage device 400 in accordance with the information of the filter processing command (1102). This read command may be issued once or a plurality of times. In the illustrated example, the FPGA 500 divides reading of 1-megabyte data into four times, and issues four read commands each for reading 256-kilobyte data.

The four read commands are, for example, four 256-kilobyte read commands for LBAs=0x1000, 0x1200, 0x1400, and 0x1600, and the FPGA 500 uses those commands to read 1-megabyte data from the LBA=0x1000.

The data read from the DB storage area 404 of the storage device 400 is stored in the buffer memory 503 of the FPGA 500 (1103). The I/O processing circuit 501, which has received four read completion notifications, instructs the filter processing circuit 502 to execute predetermined filter processing for data in the buffer memory 503 (1104).

The filter processing circuit 502 that has received the instruction executes the filter processing having the filter conditional expression A.

Next, the filter processing circuit 502 transmits a result of the filter processing to the system memory 210 of the DB server 20 (1105). The transmission destination address may be specified by the filter processing command, or may be configured as a fixed address set in advance.

After completion of the filter processing, the filter processing circuit 502 transmits a completion notification to the I/O processing circuit 501 (1106). The I/O processing circuit 501, which has received the completion notification, notifies the host processor 200 of completion of the filter processing, and the host processor 200 receives the completion notification. In this manner, a series of filter processing is finished (1107).

In FIG. 5, the description given above is based on the example of using the address of the system memory 210 as an address for storing resultant data of the filter processing, but the address for storing resultant data of the filter processing is not limited thereto. For example, when the address for storing resultant data of the filter processing is information for indicating an address of the storage device 400, the resultant data of the filter processing may be written into the storage device 400, when the address for storing resultant data of the filter processing is information for indicating an address of the accelerator board 51, the resultant data of the filter processing may be written into the accelerator board 51, or when the address for storing resultant data of the filter processing is information for indicating an address of the accelerator board 50, the resultant data of the filter processing may be stored in the memory of the accelerator board 50.

Further, an example of directly inserting the filter conditional expression A into the filter processing command is described above. However, the information is not limited thereto, and it suffices that the information is information for acquiring the filter conditional expression. For example, the filter conditional expression may be stored in the system memory 210 and the storage address of the filter conditional expression may be inserted into the filter processing command.

Figure 21:
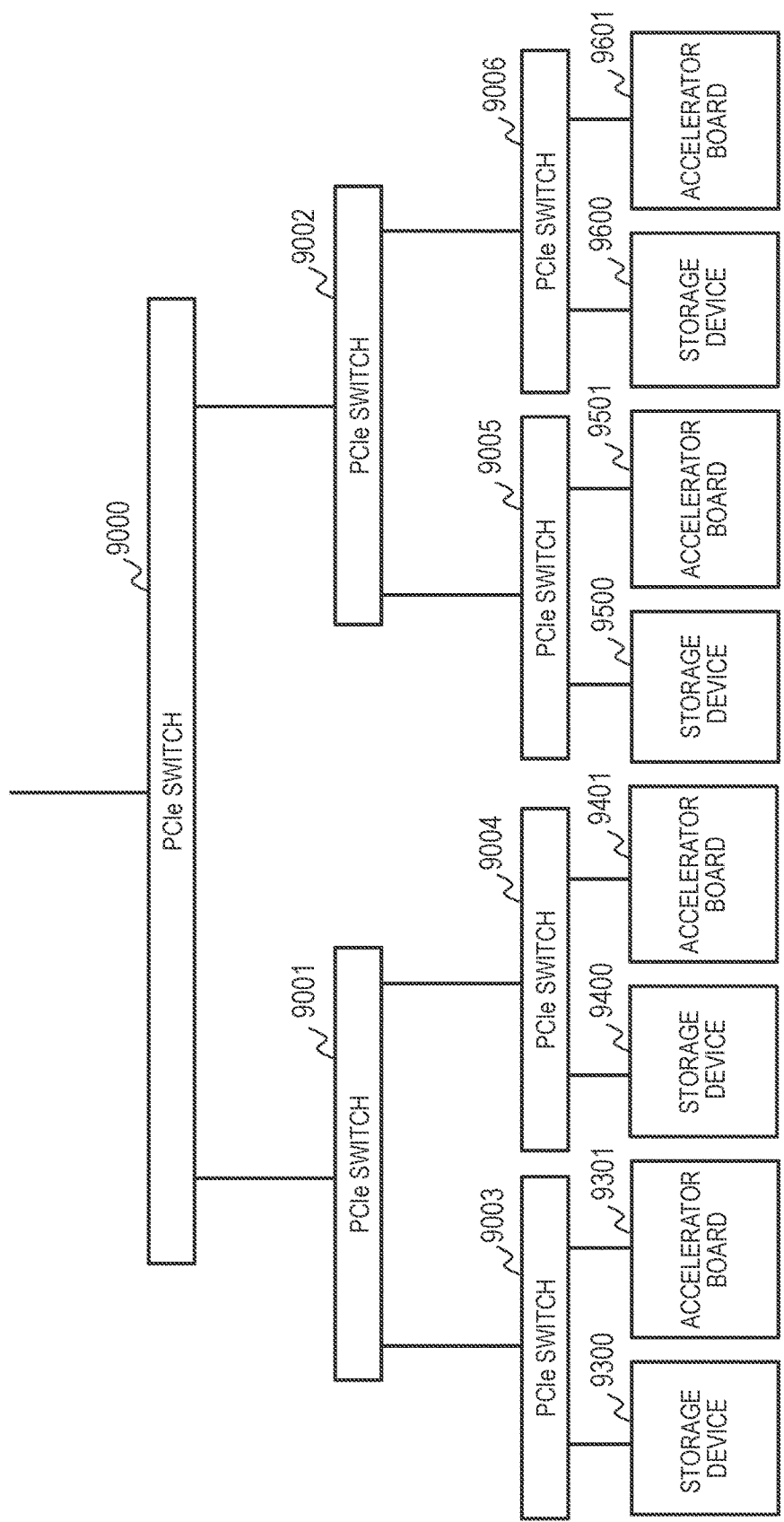
FIG. 21 is an illustration of the first embodiment of this invention, and is a block diagram for illustrating an example of the information processing apparatus.

Through the processing of FIG. 5, the accelerator board 50 coupled to an endpoint of the PCIe bus directly accesses the storage device 400 also serving as an endpoint, to thereby achieve reduction of loads on the DB server 20. Further, the data of the DB 450 does not pass through the PCIe bus 2300, and is read to the FPGA 500 via the PCIe switch 2320. Thus, the performance (e.g., transfer speed) of the PCIe bus 2300 does not become a bottleneck, and the FPGA 500 can execute the filter processing quickly. In particular, this invention is especially effective when, as illustrated in FIG. 21, PCIe switches 9000 to 9006 are formed in a tree configuration and a large number of combinations of storage devices and accelerators, namely, storage devices 9300, 9400, 9500, and 9600, and accelerators 9301, 9401, 9501, and 9601, are coupled to those PCIe switches. In this configuration, when the storage device to be accessed by the accelerator 9301 is configured to be a storage device having the number of hops of 1, pieces of data are read from the respective storage devices 9300, 9400, 9500, and 9600 via the PCIe switches 9003 to 9006 in a closed manner. Thus, even when the number of combinations of storage devices and accelerators is increased, the bandwidths of the PCIe switches (9000, 9001, and 9002), which are placed higher in the tree configuration, are not used. Therefore, it is possible to enhance the filter processing performance.

Figure 6:
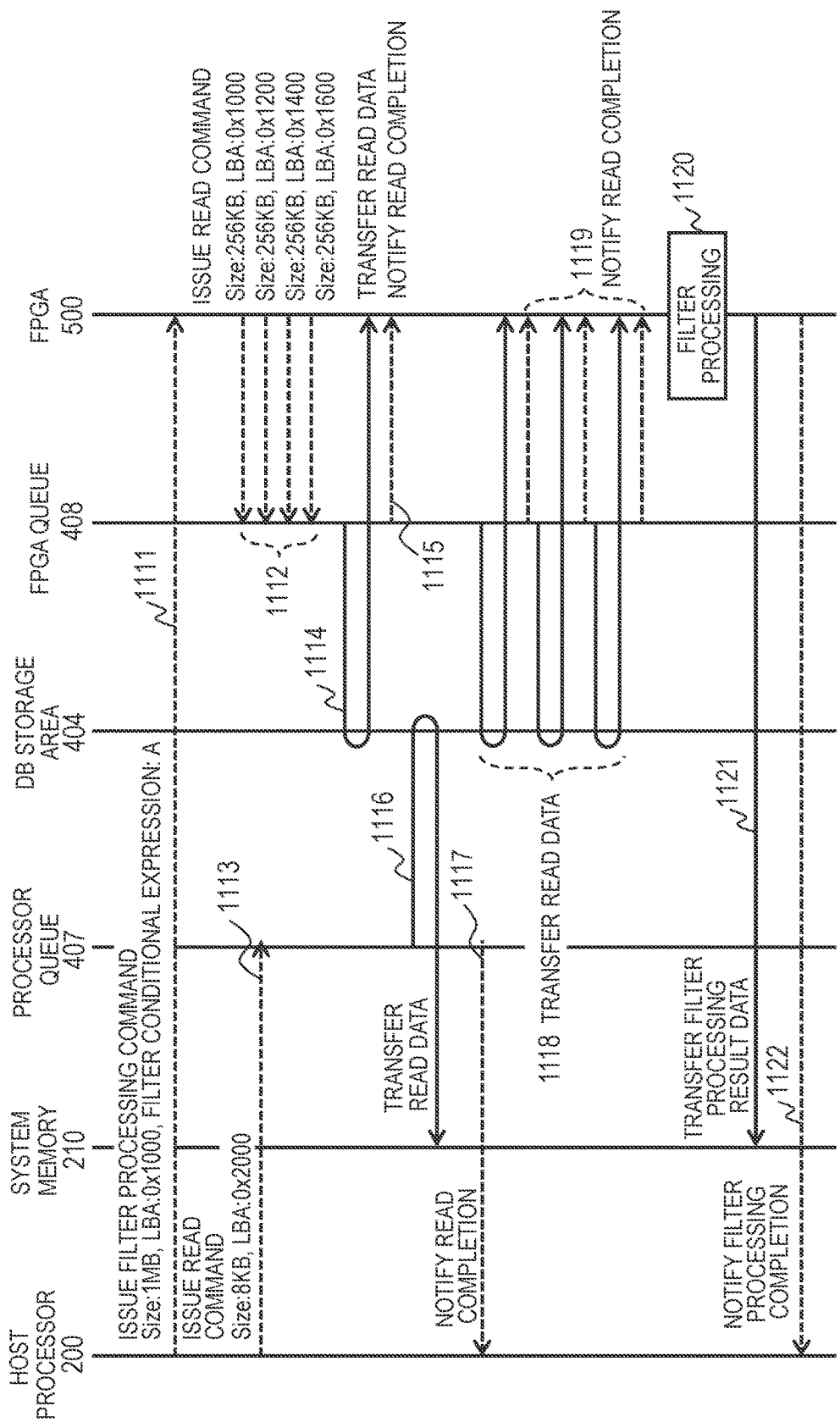
FIG. 6 is a sequence diagram for illustrating an example of processing to be performed when the host processor and the accelerator board both issue I/Os according to the first embodiment of this invention.

FIG. 6 is a sequence diagram for illustrating an example of processing to be performed when the host processor 200 and the accelerator board 50 both issue I/Os. An example of the host processor 200 reading the storage device 400 when the FPGA 500 is executing filter processing is illustrated in the sequence diagram of FIG. 6.

Similarly to the sequence diagram of the filter processing of FIG. 5, the host processor 200, which executes the DBMS 120, first issues a filter processing command for instructing filter processing to the FPGA 500 (1111).

The I/O processing circuit 501 of the FPGA 500, which has received the filter processing command from the host processor 200, issues a read command to the storage device 400 in accordance with the information of the filter processing command (1112). In this case, the FPGA 500 uses the FPGA queue 408 whose address was notified by the host processor 200 at the time of initialization described above. Further, it is assumed that the host processor 200 issues a read command to the storage device 400 at the same time (1113). In this case, the host processor 200 uses the processor queue 407.

In the illustrated example, the storage device 400 executes the first read command of the FPGA queue 408, reads data from the DB storage area 404, and stores the read data into the buffer memory 503 of the FPGA 500 (1114). The storage device 400 transmits a read completion notification of the first read command to the FPGA 500 (1115).

Next, the storage device 400 executes the read command of the processor queue 407, reads data from the DB storage area 404, and stores the read data into the system memory 210 (1116). The storage device 400 transmits a read completion notification of the read command to the host processor 200 (1117).

The storage device 400, which has finished the I/O processing of the host processor 200, sequentially executes the second and subsequent read commands of the FPGA queue 408, reads data from the DB storage area 404, and stores the read data into the buffer memory 503 of the FPGA 500 (1118). The storage device 400 transmits read completion notifications of the respective read commands to the FPGA 500 (1119).

The I/O processing circuit 501, which has received the read completion notification four times, instructs the filter processing circuit 502 to execute predetermined filter processing for data in the buffer memory 503 (1120). The filter processing circuit 502, which has received the instruction, executes the predetermined filter processing.

Next, the filter processing circuit 502 transmits a result of the filter processing to the system memory 210 of the DB server 20 (1121). After completion of the filter processing, the filter processing circuit 502 transmits a completion notification to the I/O processing circuit 501. The I/O processing circuit 501, which has received the completion notification, notifies the host processor 200 of completion of the filter processing, and the host processor 200 receives the completion notification. In this manner, a series of filter processing is finished (1122).

As can be seen from the processing of FIG. 6 described above, the storage device 400 prepares the processor queue 407 and the FPGA queue 408 separately due to the initialization processing (FIG. 4), and any of those queues can be used to read/write data from/to the DB storage area 404. Thus, those read requests are correctly processed without necessitating the host processor 200 and the FPGA 500 to execute exclusive processing.

For example, in FIG. 6, an example is illustrated in which the host processor 200 issues a read command to the storage device 400 while the FPGA 500 is issuing four read commands to the storage device 400. However, the FPGA 500 and the host processor 200 have separate queues to write read commands to, and thus the I/O controller 401 does not need to perform exclusive processing between the FPGA 500 and the host processor 200. Therefore, the information processing apparatus 10 can issue I/O commands in parallel from the FPGA 500 and the host processor 200 without degrading the processing performance.

Figure 7:
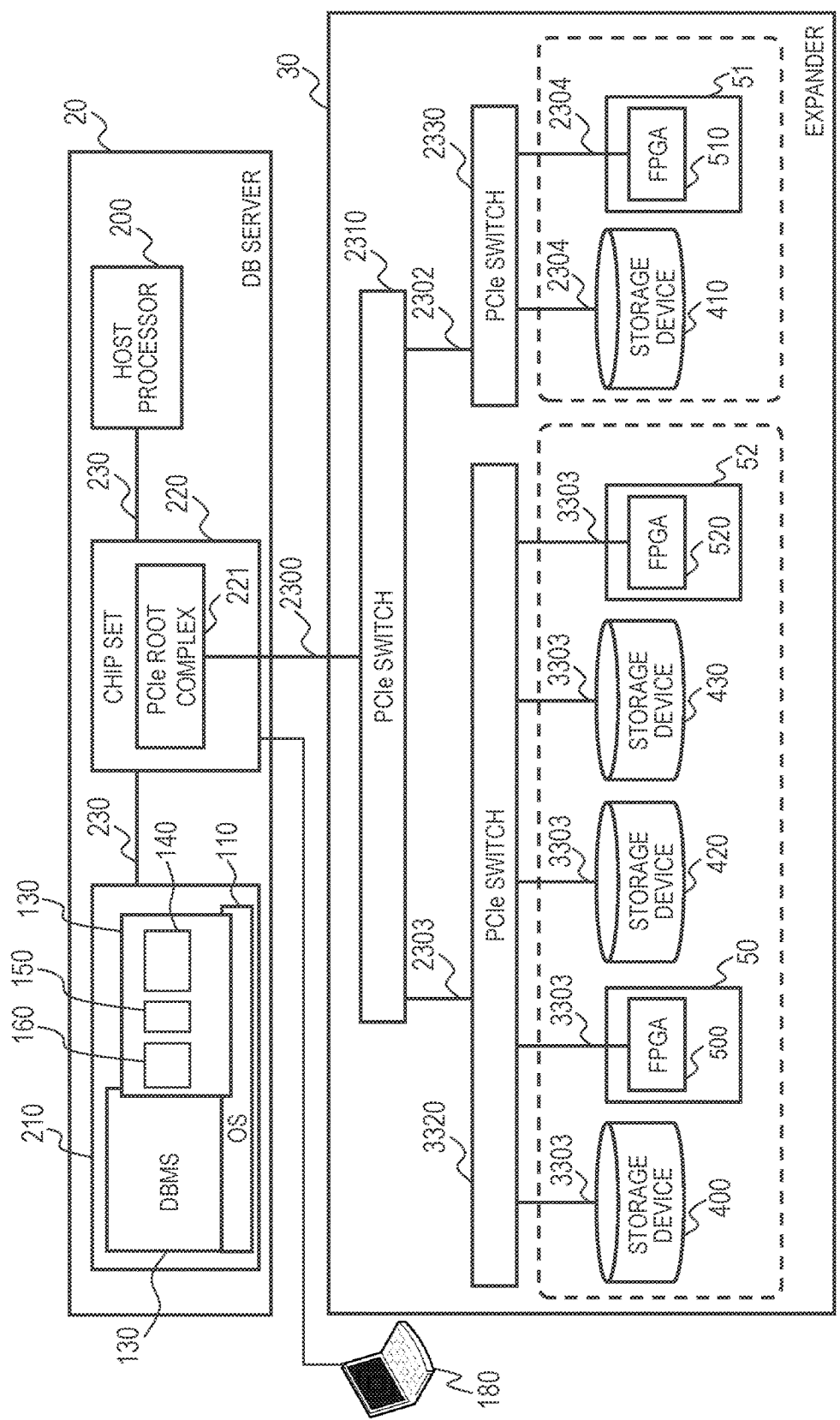
FIG. 7 is a block diagram for illustrating an example of a configuration in which a plurality of combinations of storage devices and accelerator boards are coupled to one PCIe switch according to the first embodiment of this invention.
Figure 8:
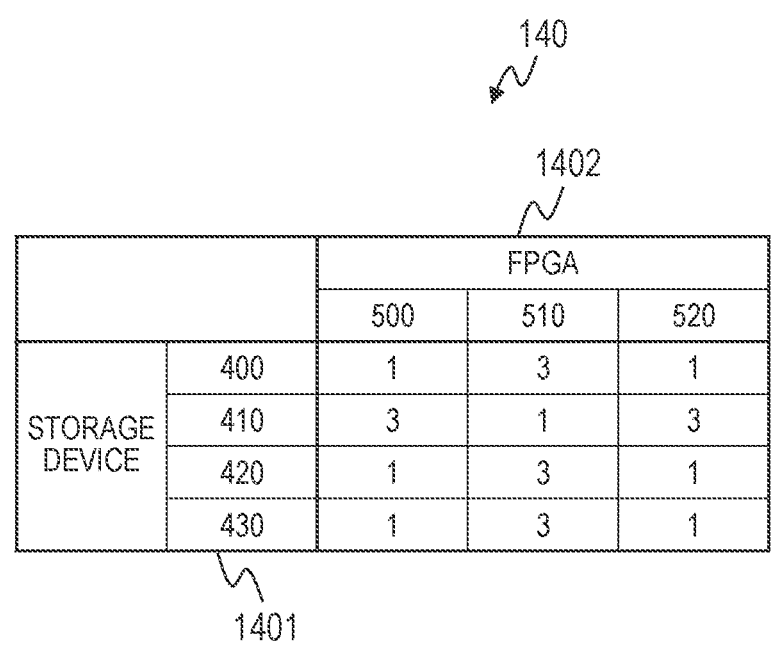

Next, a description is given of an assignment method in a case where the plurality of storage devices 400 and accelerator boards 50 are coupled to the same PCIe switch in the first embodiment with reference to FIG. 7 to FIG. 9.

FIG. 7 is a block diagram for illustrating an example of a configuration in which a plurality of combinations of storage devices and accelerator boards are coupled to one PCIe switch 3320. The information processing apparatus 10 of FIG. 7 is obtained by incorporating a PCIe switch 3320 and a PCIe bus 3303 in place of the PCIe switch 2320 illustrated in FIG. 2, coupling storage devices 410 and 420 and an accelerator board 52 to those components, and adding tables 140 to 160 to the PCIe driver 130. Other configurations are the same as those of FIG. 2.

FIG. 8 is a hop count table 140 for showing the number of hops between the storage devices 400, 410, 420, and 430 and the accelerator boards 50 to 52. The hop count table 140 represents the number of hops between the storage devices 400, 410, 420, and 430 and the FPGAs 500, 510, and 520 in FIG. 7. The hop count table 140 is set in advance by, for example, an administrator of the information processing apparatus 10, managed by the PCIe driver 130, and stored in the system memory 210.

Regarding the storage device 410 coupled to the PCIe switch 2330, only the FPGA 510 of the accelerator board 51 has the minimum number of hops, and thus the storage device 410 can be assigned to the FPGA 510 only based on the number of hops.

On the contrary, regarding the storage devices 400, 420, and 430, there are a plurality of accelerator boards 50 and 52 having the minimum number of hops. In such a case, selection may be based on closeness of distance information in the PCIe network configuration. In this case, the storage device 400 and the storage device 410 are assigned to the FPGA 500 in the configuration of FIG. 7. Further, the storage device 430 is assigned to the FPGA 520. The distance information in the PCIe network configuration may be defined such that as port numbers of the PCIe switch 3320 are close to each other, the distance between the components becomes smaller.

Alternatively, the OS 110 or the PCIe driver 130 may use information other than the distance information, for example, the number of hops, to determine assignment of the storage device 400 and the accelerator board 50. This information can be acquired from the storage device or the accelerator board 50, and is, for example, the filter processing performance of the accelerator board 50, the capacity of the storage device, and the reading performance of the storage device as shown in FIG. 9A and FIG. 9B.

Figure 9A:
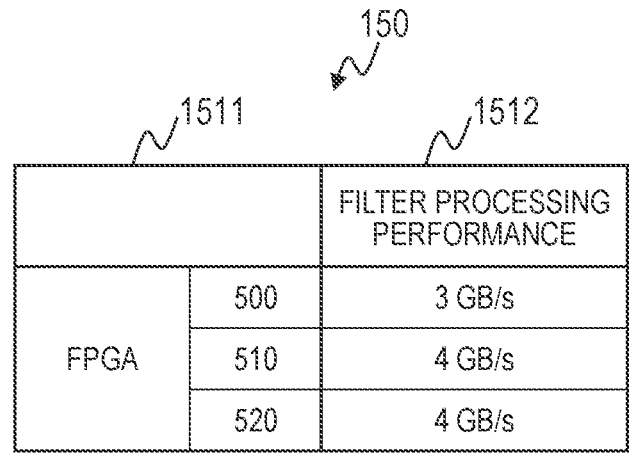
FIG. 9A is a FPGA performance table for showing the filter processing performance of the FPGA according to the first embodiment of this invention.

FIG. 9A is a FPGA performance table 150 for showing the filter processing performance of the FPGA. The FPGA performance table 150 is formed of an identifier 1511 and a filter processing performance 1512 of the FPGA. The FPGA performance table 150 may be set in advance by, for example, an administrator of the information processing apparatus 10, managed by the PCIe driver 130, and stored in the system memory 210. In other cases, the PCIe driver 130 may make an inquiry about the FPGA performance table 150 at the time of recognition of the accelerator, and store the result into the system memory 210.

Figure 9B:
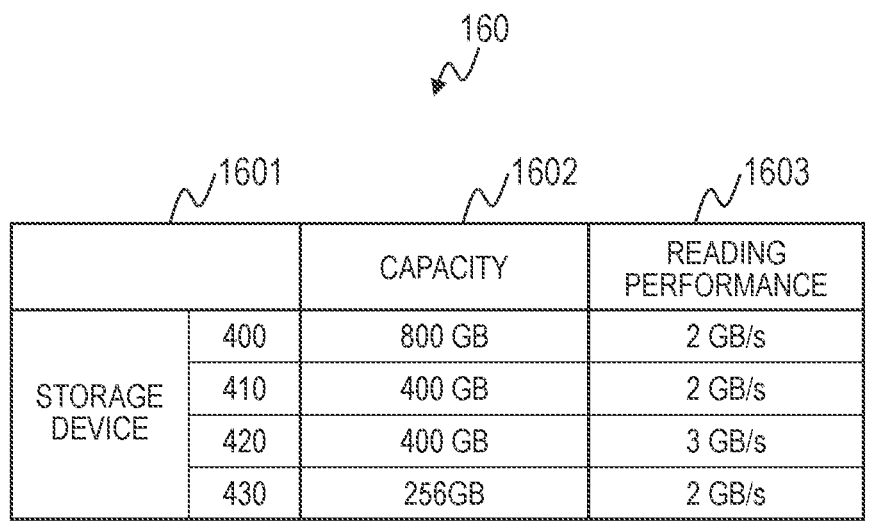
FIG. 9B is a storage device performance table for showing performance of storage devices according to the first embodiment of this invention.

FIG. 9B is a storage device performance table 160 for showing performance of storage devices. The storage device performance table 160 is formed of an identifier 1601 of a storage device, a capacity 1602, and reading performance 1603. The storage device performance table 160 may be set in advance by, for example, an administrator of the information processing apparatus 10, managed by the PCIe driver 130, and stored in the system memory 210. In other cases, the PCIe driver 130 may make an inquiry about performance of a storage device at the time of recognition of the storage device, and store the result into the system memory 210.

In the examples of FIG. 9A and FIG. 9B, on the basis of a principle that a storage device having a larger capacity is assigned to a device having higher processing performance, the OS 110 or the PCIe driver 130 may assign the storage device 420 to the FPGA 500 and assign the storage device 400 and the storage device 430 to the FPGA 510.

Alternatively, the OS 110 or the PCIe driver 130 may assign the storage device 420 to the FPGA 500 and assign the storage devices 400 and 410 to the FPGA 520 so that the filter performance of the accelerator board and the reading performance of the storage device are equivalent to each other.

Still alternatively, the OS 110 or the PCIe driver 130 may assign the storage devices 400, 420, and 430 to the FPGA 500 and also assign the storage devices 400, 420, and 430 to the FPGA 510. In this case, the I/O controllers 401 of the storage devices 400, 420, and 430 each generate I/O queues including not only the processor queue 407 for the host processor 200 but also the FPGA queue 408 for the FPGA 500 and the FPGA queue 409 for the FPGA 510. The host processor 200 can use both of the FPGA 500 and the FPGA 510 in parallel for the filter processing using the databases 450 of the storage devices 400, 410, 420, and 430.

In the information processing apparatus 10, through such assignment of FPGAs and storage devices, for example, the total reading performance of the storage devices and the filter performance of the accelerator board can be made to be equivalent to each other. Thus, it is possible to optimize the overall performance of the information processing apparatus 10 by employing, for example, a configuration in which both of the storage device and the accelerator board can exhibit their maximum performance at the time of high loads.

Figure 10:
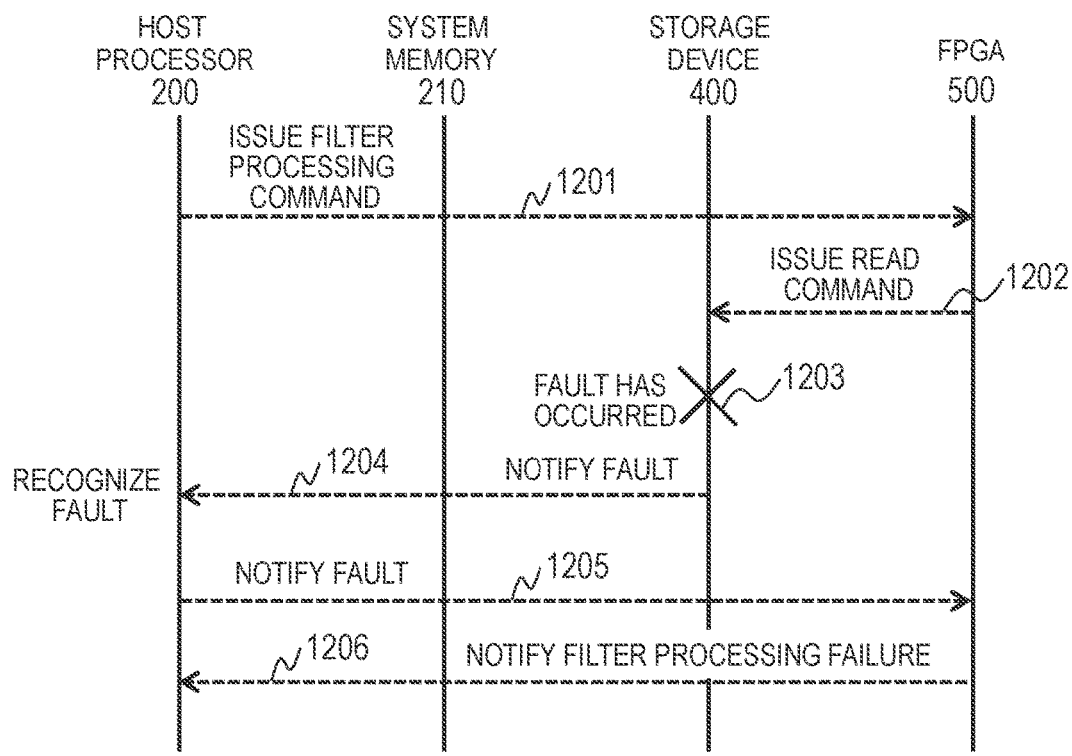
FIG. 10 is a sequence diagram for illustrating an example of processing to be performed by the information processing apparatus when a fault has occurred in the storage device according to the first embodiment of this invention.

Next, a description is given of an example of processing in a case where a fault has occurred in the storage device 400 in the first embodiment. FIG. 10 is a sequence diagram for illustrating an example of processing to be performed by the information processing apparatus 10 when a fault has occurred in the storage device 400.

When the storage device 400 is assigned to the FPGA 500, the host processor 200, which executes the DBMS 120, issues a filter processing command to the FPGA 500, and executes filter processing for the DB 450 of the storage device 400 (1201).

The FPGA 500 receives the filter processing command, and issues a read command to the storage device 400 to read the DB 450 to be processed (1202).

However, when a fault has occurred in the storage device 400 at this point (1203), for example, the storage device 400 detects its fault and notifies the host processor 200 of the fault via the PCIe root complex 221 (1204).

The host processor 200, which has received a fault notification, detects the fault of the storage device 400, and notifies the FPGA 500 of this fault (1205). The FPGA 500, which has received the fault notification, has not finished the filter processing, and thus notifies the host processor 200 of the fact that the filter processing has failed due to the fault.

In the example of FIG. 10, the description given above is based on the example of the storage device 400 detecting its fault by itself and notifying the host processor 200 of the fault, but the host processor 200 may monitor a state of the storage device 400, detect a fault, and notify the FPGA 500 of the fault of the storage device 400.

Further, the fact that a fault has occurred in the storage device 400 may be detected by the FPGA 500 through pooling or other such processing. For example, detection may be performed based on, for example, timeout of a read command issued by the FPGA 500 to the storage device 400. The FPGA 500, which has detected a fault, notifies the host processor 200 of the fault and the fact that the filter processing has failed.

In this manner, the host processor 200, which has detected the fault of the storage device 400, can notify the DB server 20 of the fact that a fault has occurred in the storage device 400 and urge the DB server 20 to replace the storage device 400. For example, a method of displaying a message notifying fault occurrence on a management screen of the DB server 20 is conceivable. In other cases, when a fault is prevented through a method, for example, mirroring, and there is a backup device of the storage device 400, that device can be used instead of the storage device 400.

Figure 11:
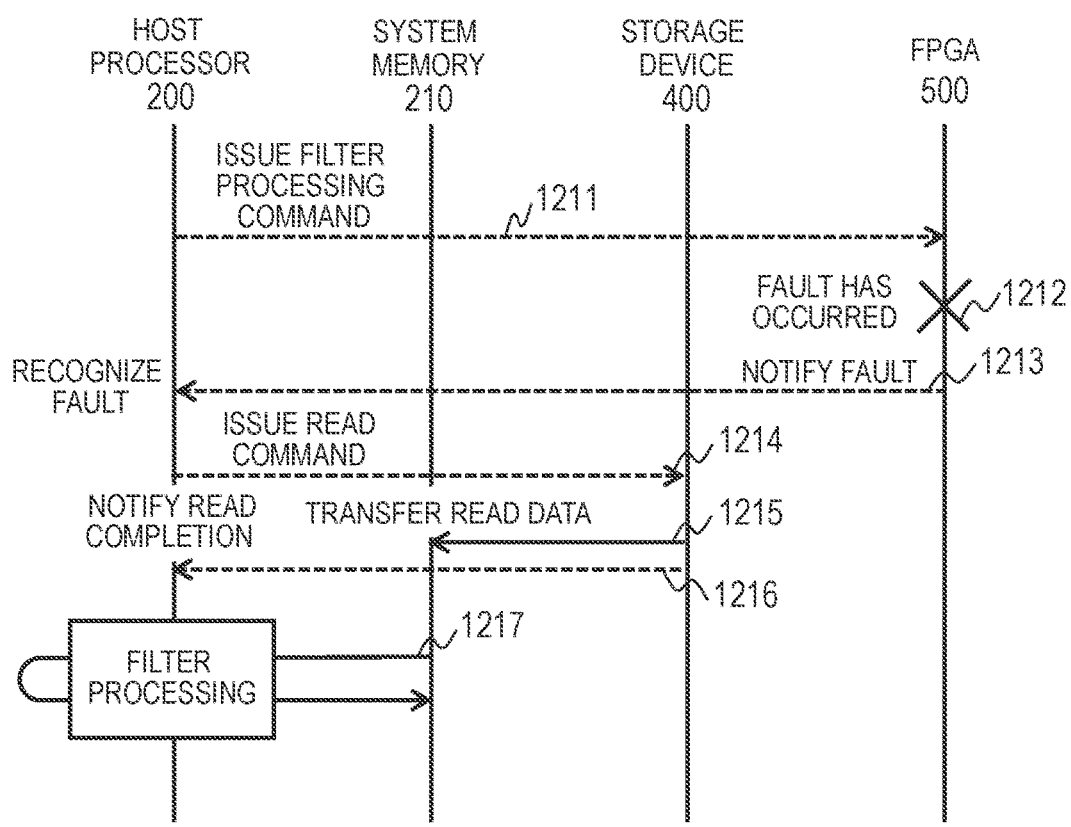
FIG. 11 is a sequence diagram for illustrating an example of processing to be performed by the information processing apparatus when a fault has occurred in the accelerator board according to the first embodiment of this invention.

Next, a description is given of an example of processing in a case where a fault has occurred in the accelerator board 50 in the first embodiment. FIG. 11 is a sequence diagram for illustrating an example of processing to be performed by the information processing apparatus 10 when a fault has occurred in the accelerator board 50.

When the storage device 400 is assigned to the FPGA 500, the host processor 200, which executes the DBMS 120, instructs the FPGA 500 to execute filter processing for the DB 450 of the storage device 400 (1211).

However, when a fault has occurred in the FPGA 500 at this point (1212), the FPGA 500 notifies the host processor 200 of the fault via the PCIe root complex 221 (1213). The host processor 200, which has received a fault notification, detects the fault of the FPGA 500. Instead, the host processor 200 may monitor the FPGA 500 for detection of a fault.

The host processor 200 reads the DB 450 necessary for the filter processing from the storage device 400 (1214), and stores data into the system memory 210 (1215). After the reading is complete (1216), the host processor 200, which executes the DBMS 120, performs the filter processing for the DB 450 by itself without using the FPGA 500 (1217).

Further, the host processor 200 may reassign the storage device 400, which has been assigned to the FPGA 500, to another accelerator board 51, for example, the FPGA 510. Now, this processing is described with reference to FIG. 12.

Figure 12:
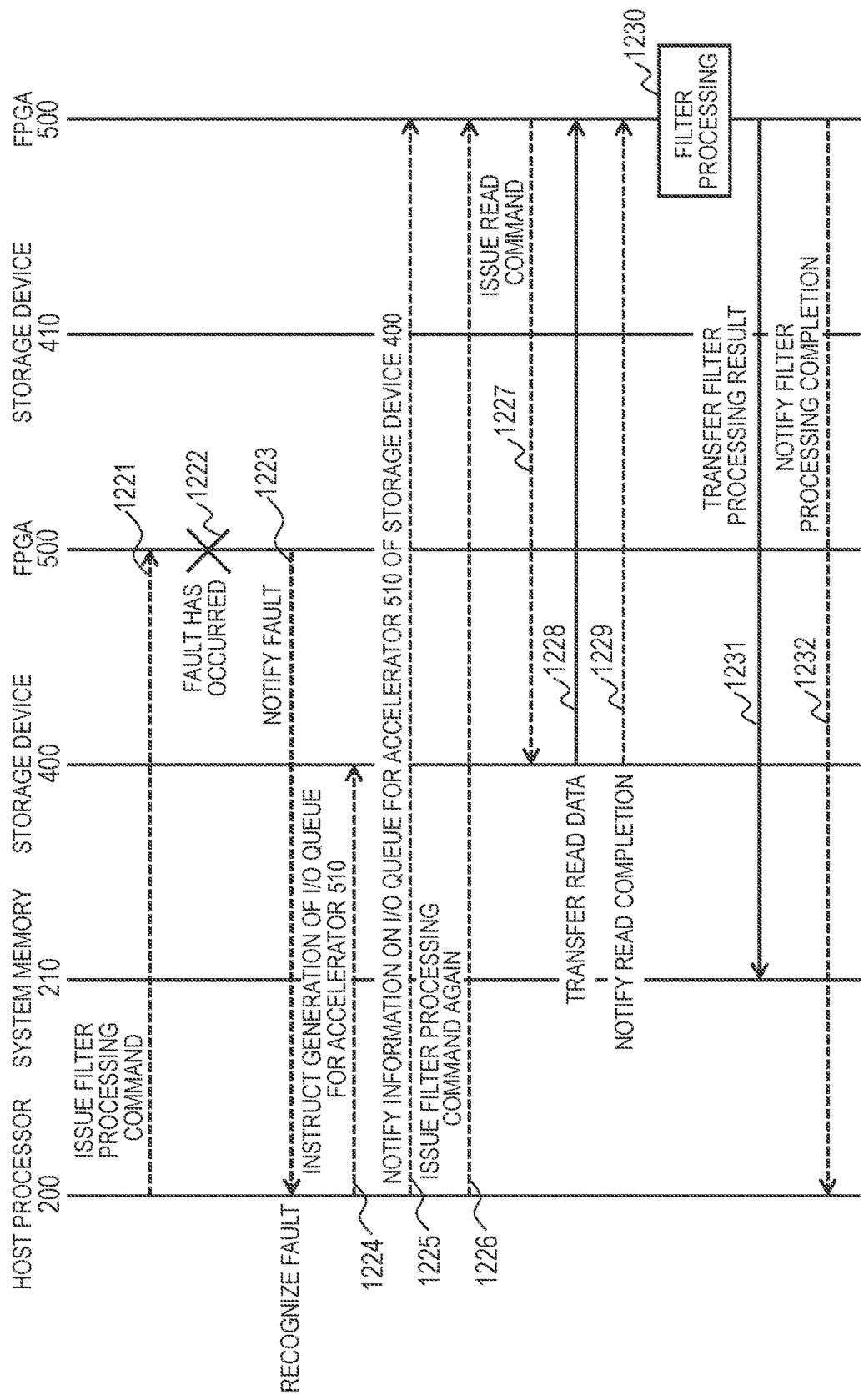
FIG. 12 is a sequence diagram for illustrating an example of reassignment processing to be performed by the information processing apparatus when a fault has occurred in the accelerator board.

FIG. 12 is a sequence diagram for illustrating an example of reassignment processing to be performed by the information processing apparatus 10 when a fault has occurred in the accelerator board 50.

When the storage device 400 is assigned to the FPGA 500, the host processor 200, which executes the DBMS 120, instructs the FPGA 500 to execute filter processing for the DB 450 of the storage device 400 (1221).

However, when a fault has occurred in the FPGA 500 at this point (1222), the FPGA 500 notifies the host processor 200 of the fault via the PCIe root complex 221 (1223). The host processor 200, which has received a fault notification, detects the fault of the FPGA 500. Instead, the host processor 200 may monitor the FPGA 500 for detection of a fault.

The host processor 200 determines to assign the storage device 400 to the newly added accelerator board 51. The host processor 200 instructs the storage device 400 to generate the FPGA queue 408 for the FPGA 510 (1224). The host processor 200 notifies the FPGA 510 of information containing an address of the FPGA queue 408 for the FPGA 510 in the storage device 400 (1225).

Next, the host processor 200, which executes the DBMS 120, again issues, to the newly added FPGA 510, a filter processing command for instructing filter processing using the DB 450 stored in the storage device 400 (1226).

The FPGA 510, which has received the filter processing command from the host processor 200, issues a read command to the storage device 400 in accordance with information of the filter processing command (1227). The data read from the DB storage area 404 of the storage device 400 is stored into a buffer memory of the FPGA 510 (1228).

When the storage device 400 finishes reading required data, the storage device 400 transmits a read completion notification to the FPGA 510 (1229). The FPGA 510, which has received the read completion notification, executes filter processing based on the filter processing command (1230).

Next, the FPGA 510 transmits a result of the filter processing to the system memory 210 of the DB server 20 (1231). After completion of the filter processing, the FPGA 510 transmits a completion notification of the filter processing to the host processor 200 (1232), and ends a series of filter processing.

The description given above is based on the example of generating the FPGA queue 408 for the newly added FPGA 510 in the storage device 400, but the FPGA queue 408 that has been used by the FPGA 500 may be continuously used by the FPGA 510. In that case, the host processor 200 notifies the FPGA 510 of takeover information for continuously using the FPGA queue 408 such as an address of the FPGA queue 408 that has been used by the FPGA 500 and the value of the FPGA queue 408.

As in the case of FIG. 12 described above, when a fault has occurred in the FPGA 500, the storage device 400 is assigned to another FPGA 510 to keep the processing performance even when a fault has occurred in the FPGA 500, to thereby achieve continuous operation of the information processing apparatus 10.

Figure 13:
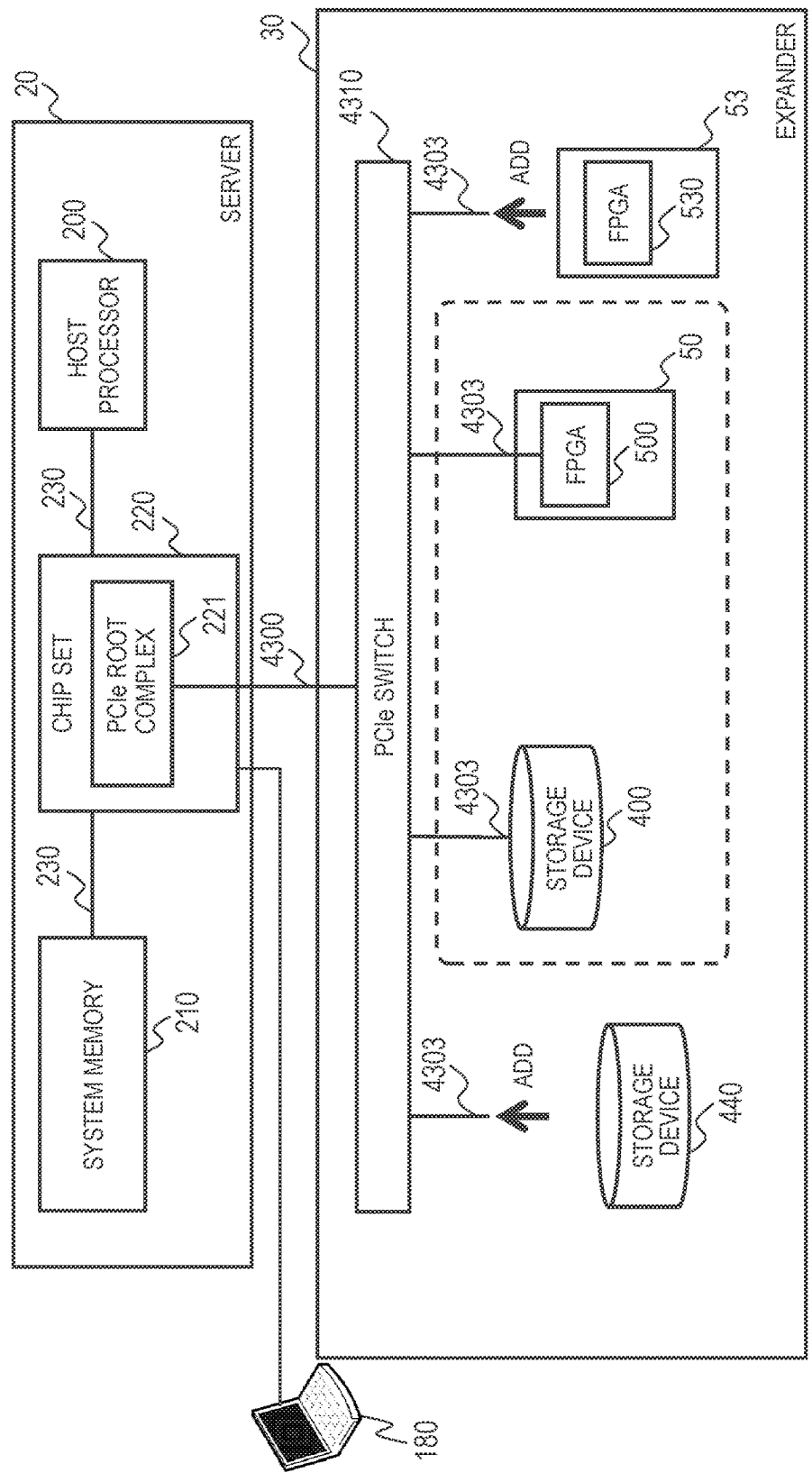
FIG. 13 is a block diagram for illustrating an example of the configuration in which a storage device and an accelerator board are added to one PCIe switch according to the first embodiment of this invention.

FIG. 13 is a block diagram for illustrating an example of the configuration in which a storage device and an accelerator board are added to one PCIe switch 4320. In the information processing apparatus 10 of FIG. 13, in place of the PCIe switch 2320 illustrated in FIG. 2, the accelerator board 50 and the storage device 400 are coupled to a PCIe switch 4310, which is coupled to the DB server 20 via a PCIe bus 4300, via a PCIe bus 4303. In addition, a storage device 440 and an accelerator board 53 are hot plugged to the PCIe switch 4310. Other configurations are the same as those of FIG. 2.

Figure 14:
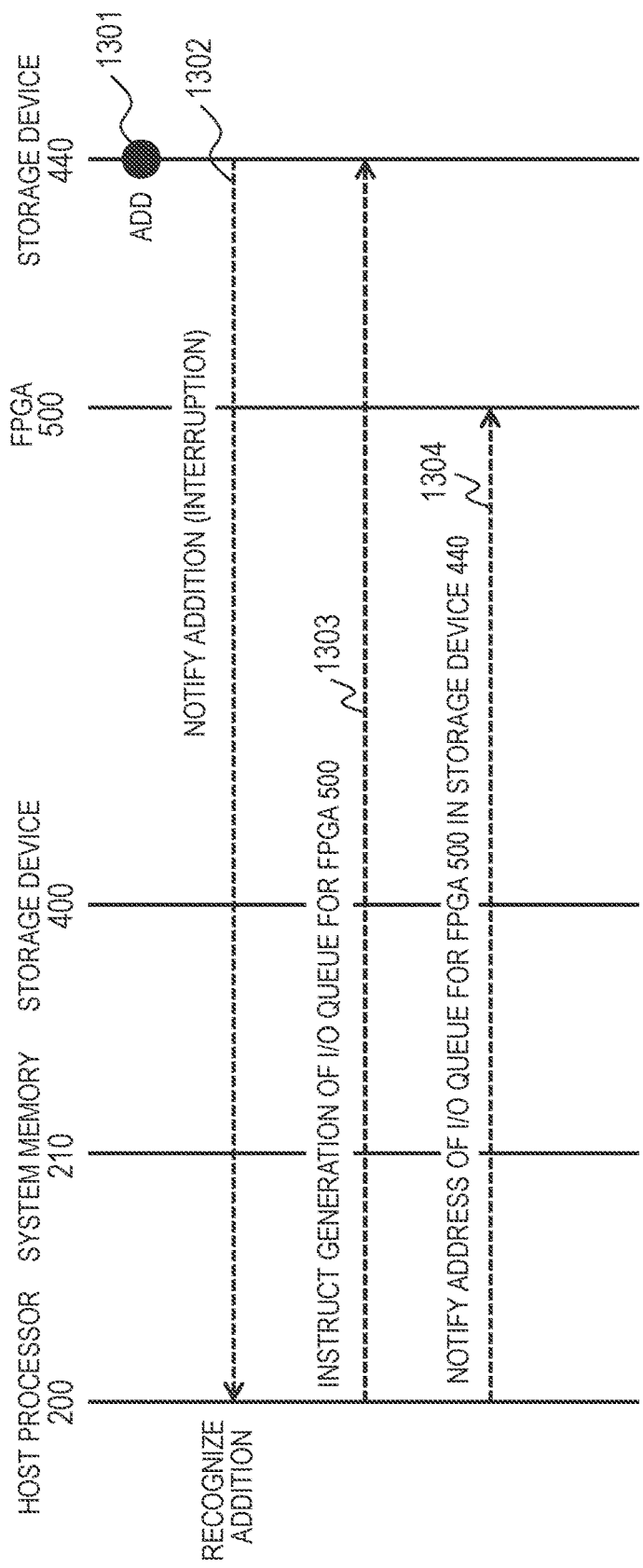
FIG. 14 is a sequence diagram for illustrating an example of processing to be performed when the storage device is added newly after completion of initialization of the information processing apparatus according to the first embodiment of this invention.

FIG. 14 is a sequence diagram for illustrating an example of processing to be performed when the storage device 440 is added newly after completion of initialization of the information processing apparatus 10.

When the storage device 440 is newly inserted into the information processing apparatus 10 in which the storage device 400 is assigned to the FPGA 500 (1301), the storage device 440 issues an interruption to the host processor 200 (1302).

The host processor 200, which has detected interruption through hot plugging and addition of the storage device 440, again performs assignment of the storage device 440 and the FPGA 500. Now, an example of additionally assigning the storage device 440 to the FPGA 500 is described.

The host processor 200 instructs the storage device 440 to generate the processor queue 407 for the host processor 200 and the FPGA queue 408 for the FPGA 500 (1303).

The host processor 200 notifies the FPGA 510 of queue information containing an address of the FPGA queue 408 for the FPGA 510 (1304).

Through such reassignment, it is possible to provide to the FPGA 500 a function of processing information on a newly added storage device after the newly added storage device, namely, the storage device 440, is added even after completion of initialization of the information processing apparatus 10.

Figure 15:
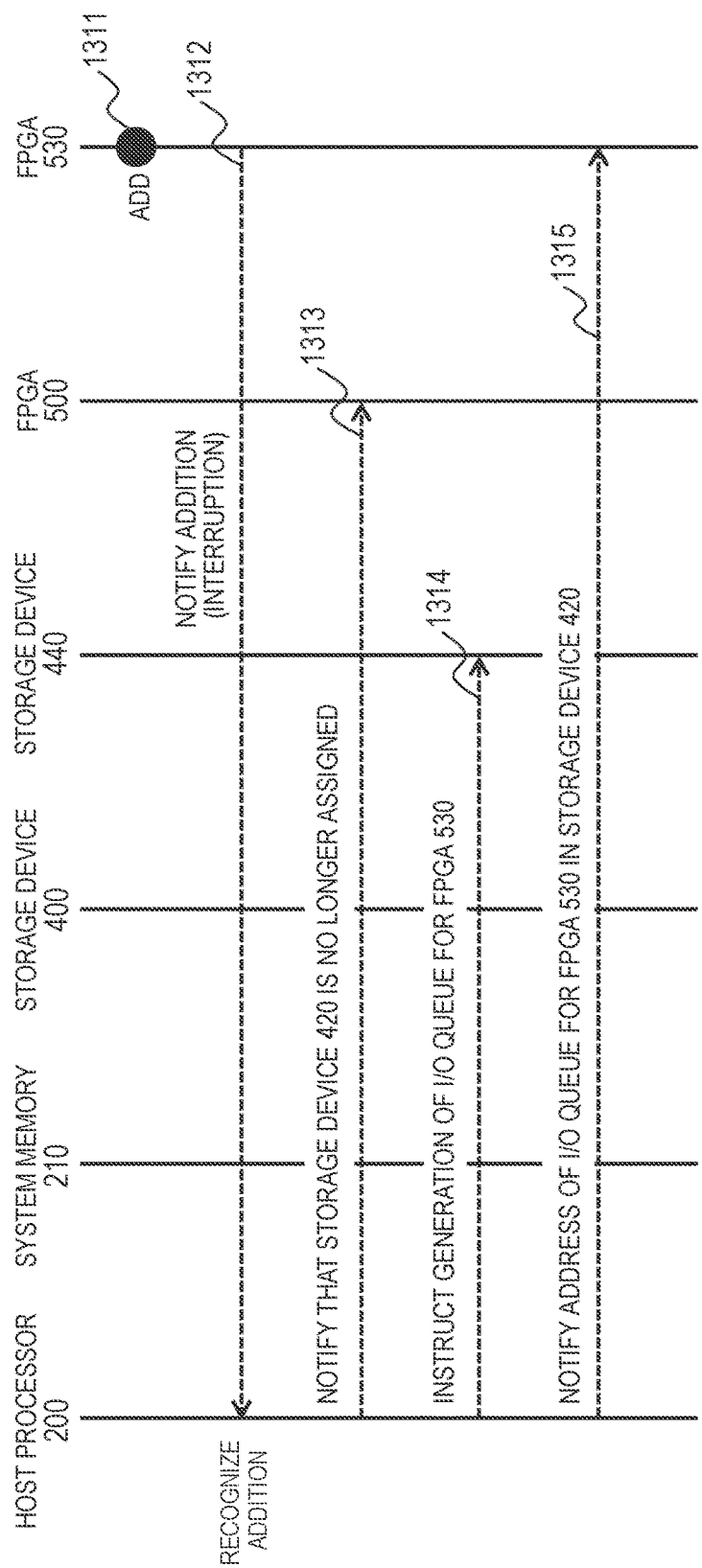
FIG. 15 is a sequence diagram for illustrating an example of processing to be performed when the accelerator board is added newly after completion of initialization of the information processing apparatus according to the first embodiment of this invention.

FIG. 15 is a sequence diagram for illustrating an example of processing to be performed when the accelerator board 53 is added newly after completion of initialization of the information processing apparatus 10.

In FIG. 13, when the accelerator board 53 (FPGA 530) is newly added to the information processing apparatus 10 in which the storage device 400 is assigned to the FPGA 500 (1311), the FPGA 530 issues an interruption to the host processor 200 (1312).

The host processor 200, which has detected interruption through hot plugging and addition of the FPGA 530, again performs assignment of the storage devices 400 and 440 and the FPGAs 500 and 530. For example, when the storage device 400 is assigned to the FPGA 500 as it is and the storage device 440 is assigned to the newly added FPGA 530, the host processor 200 notifies the FPGA 500 of the fact that the storage device 440 is no longer assigned thereto (1313).

Next, the host processor 200 instructs the storage device 440 to generate the FPGA queue 408 for the FPGA 530 (1314). After that, the host processor 200 notifies the FPGA 530 of queue information containing an address of the FPGA queue 408 for the FPGA 530 in the storage device 440 (1315). After that, the host processor 200, which executes the DBMS 120, instructs the FPGA 530 to execute filter processing that uses the DB of the storage device 440.

The description given above is based on the example of generating the FPGA queue 408 for the newly added FPGA 530 in the storage device 440, but the FPGA queue 408 that has been used by the FPGA 500 may be used continuously by the FPGA 530. In this case, the host processor 200 notifies the FPGA 530 of takeover information for continuously using the FPGA queue 408 such as an address of the FPGA queue 408 that has been used by the FPGA 500 and the value of the FPGA queue 408.

Through such reassignment, it is possible to improve the performance of the information processing apparatus 10 by enabling usage of the accelerator board 53 after the accelerator board 53 is added even after completion of initialization of the information processing apparatus 10.

As described above, according to the first embodiment, the host processor 200 of the DB server 20 notifies the FPGAs 500, which are accelerators serving as endpoints of the PCIe buses 2300 to 2304, of pieces of queue information on the storage devices 400 also coupled to those endpoints. With this, the FPGAs 500 serving as endpoints of the PCIe buses 2300 to 2304 can access the storage devices 400 also serving as those endpoints. Then, the FPGAs 500 can directly read data from the storage devices 400 and execute a part of processing of the host processor 200, to thereby speed up the processing of the information processing apparatus 10.

In the first embodiment, the description given above is based on the usage of filter processing for the database 450, but the processing to which this invention is applied is not limited to the filter processing for the database 450, and it suffices that loads of such processing on the host processor 200 can be offloaded to the accelerator board 50. For example, this invention may be applied to data compression processing.

Further, in the first embodiment, the description given above is based on the example of the host processor 200 notifying the accelerator board 50 of the address of the admin queue 406 in the NVMe or the addresses of the I/O queues 407 to 409, but this invention is not limited to the NVMe or the queue interface. It suffices that the processor notifies the accelerator board 50 of an address of an initial setting interface for enabling an I/O command to be issued or an address of an interface for issuing an I/O to a storage device from another device.

Still further, in the first embodiment, as illustrated in FIG. 2, the description given above is based on the example of executing the filter processing for the DB 450 in the configuration in which the storage device 400 and the accelerator board 50 are coupled to the PCIe network outside the DB server 20. However, this invention is not limited to this configuration, and it suffices that the host processor 200, the storage device 400, and the accelerator board 50 are coupled to one another via a network in the configuration.

Figure 16:
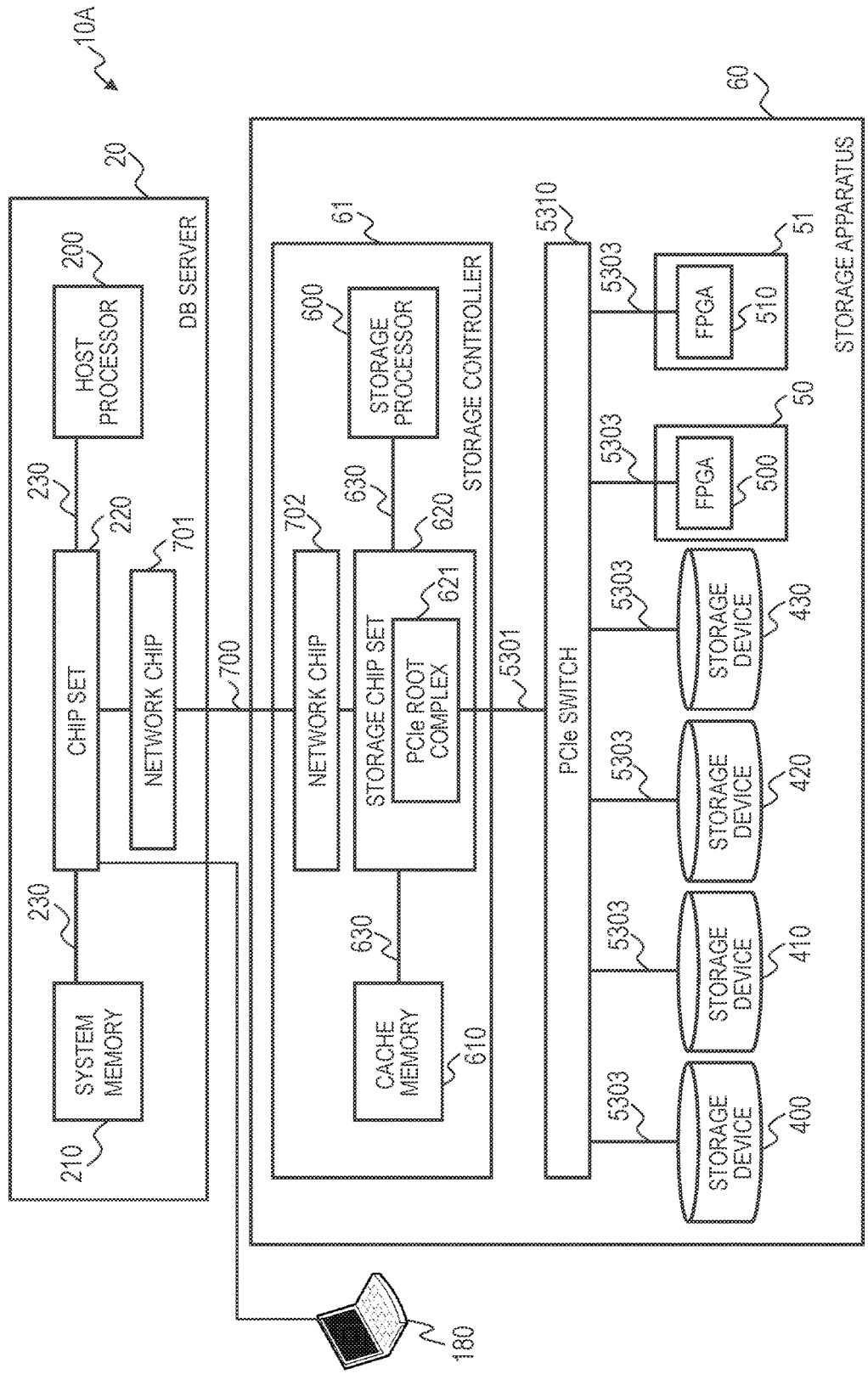
FIG. 16 is an illustration of a modification example of the first embodiment, and is a block diagram for illustrating an example of an information processing apparatus according to the first embodiment of this invention.

For example, a configuration of mounting the storage device 400 and the accelerator board 50 on a PCIe slot inside the DB server 20 or the configuration of the information processing apparatus 10 of FIG. 16 may be employed.

FIG. 16 is an illustration of a modification example of the first embodiment, and is a block diagram for illustrating an example of an information processing apparatus 10A. The information processing apparatus 10A includes a storage apparatus 60 coupled to the DB server 20 via a server-storage network 700 (e.g., fiber channel or InfiniBand). The storage apparatus 60 includes a storage controller 61 having a storage processor 600, a cache memory 610, and a storage chip set 620.

The storage chip set 620 of the storage controller 61 includes a PCIe root complex 621. The PCIe root complex 621 is coupled to a PCIe switch 5310 via a PCIe bus 5301.

The accelerator boards 50 and 51 including the FPGAs 500 and 510 and the storage devices 400, 410, 420, and 430 are coupled to the PCIe switch 5310 via a PCIe bus 5303.

Further, in the first embodiment, the description given above is based on the example of using the PCIe bus as a bus for coupling the host processor 200, the storage device 400, and the accelerator board 50 to one another, but a bus to be used in this invention is not limited to the PCIe bus. For example, a serial-attached SCSI (SAS) bus may be used in place of the PCIe bus.

Second Embodiment

Figure 17:
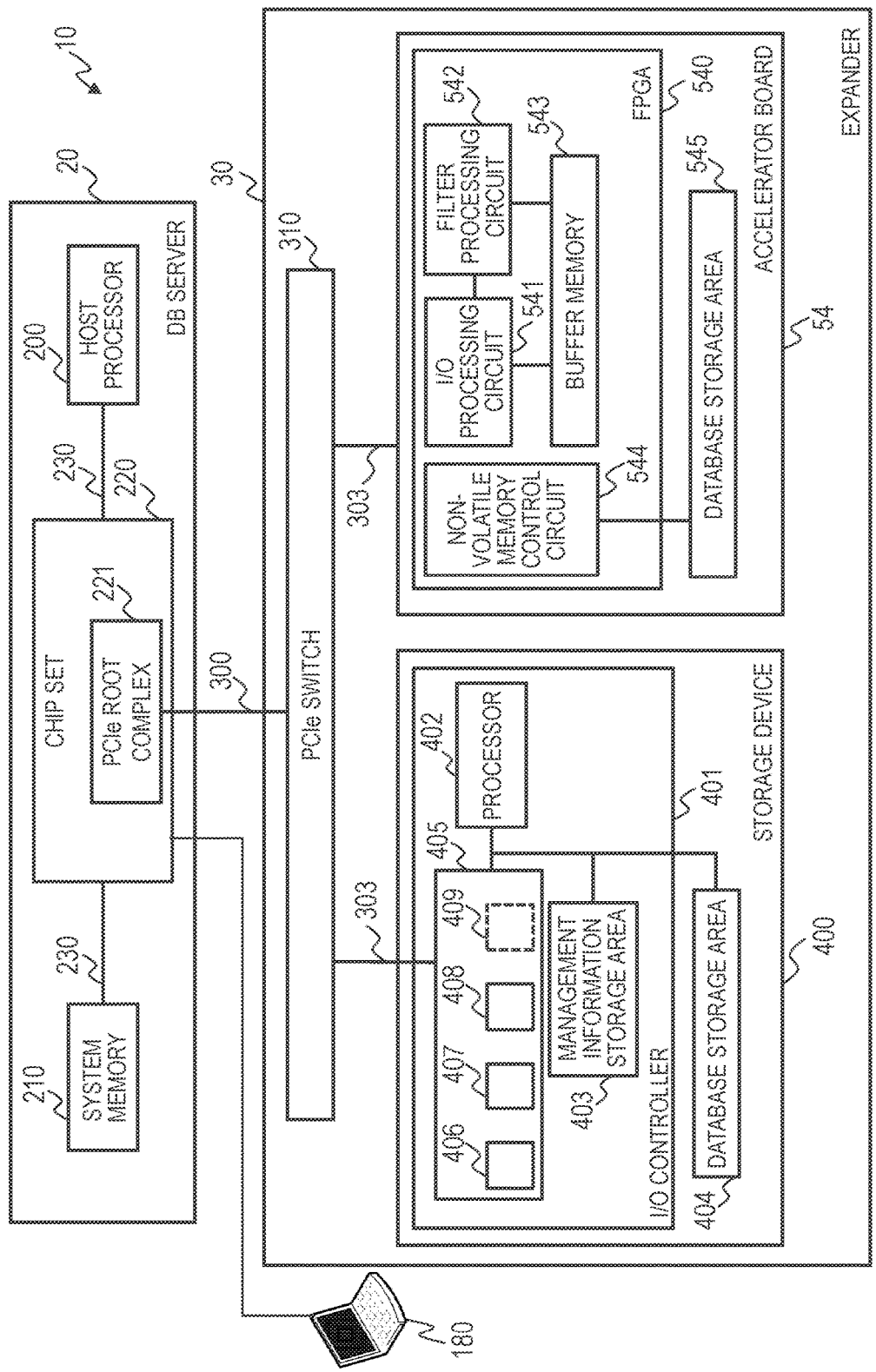
FIG. 17 is an illustration of a second embodiment of this invention, and is a block diagram for illustrating an example of the information processing apparatus.

FIG. 17 is an illustration of a second embodiment of this invention, and is a block diagram for illustrating an example of the information processing apparatus 10. In the second embodiment, an accelerator board 54 is adopted in place of the accelerator board 50 and only the PCIe switch 310 is provided. Other configurations are similar to those of the first embodiment.

In the first embodiment, the description given above is based on the example of the accelerator board 50 without a memory element issuing an I/O command to the storage device 400. However, in this invention, a device having the accelerator board 50 mounted thereon may have a memory element.

For example, the information processing apparatus 10 of FIG. 17 includes the accelerator board 54 having both of a FPGA 540 serving as an accelerator and a DB storage area 545 serving as a non-volatile memory mounted thereon and the storage device 400.

Similarly to the first embodiment, in the DB server 20, the host processor 200 is configured to generate the I/O queue 409 for an FPGA in the I/O controller 401 of the storage device 400, and notify the FPGA 540 of the generated queue information. With this, the FPGA 540 can use the queue information to issue an I/O command to the storage device 400.

Now, a description is given of processing to be performed when a filter processing command is issued to the accelerator board 54.

Figure 18:
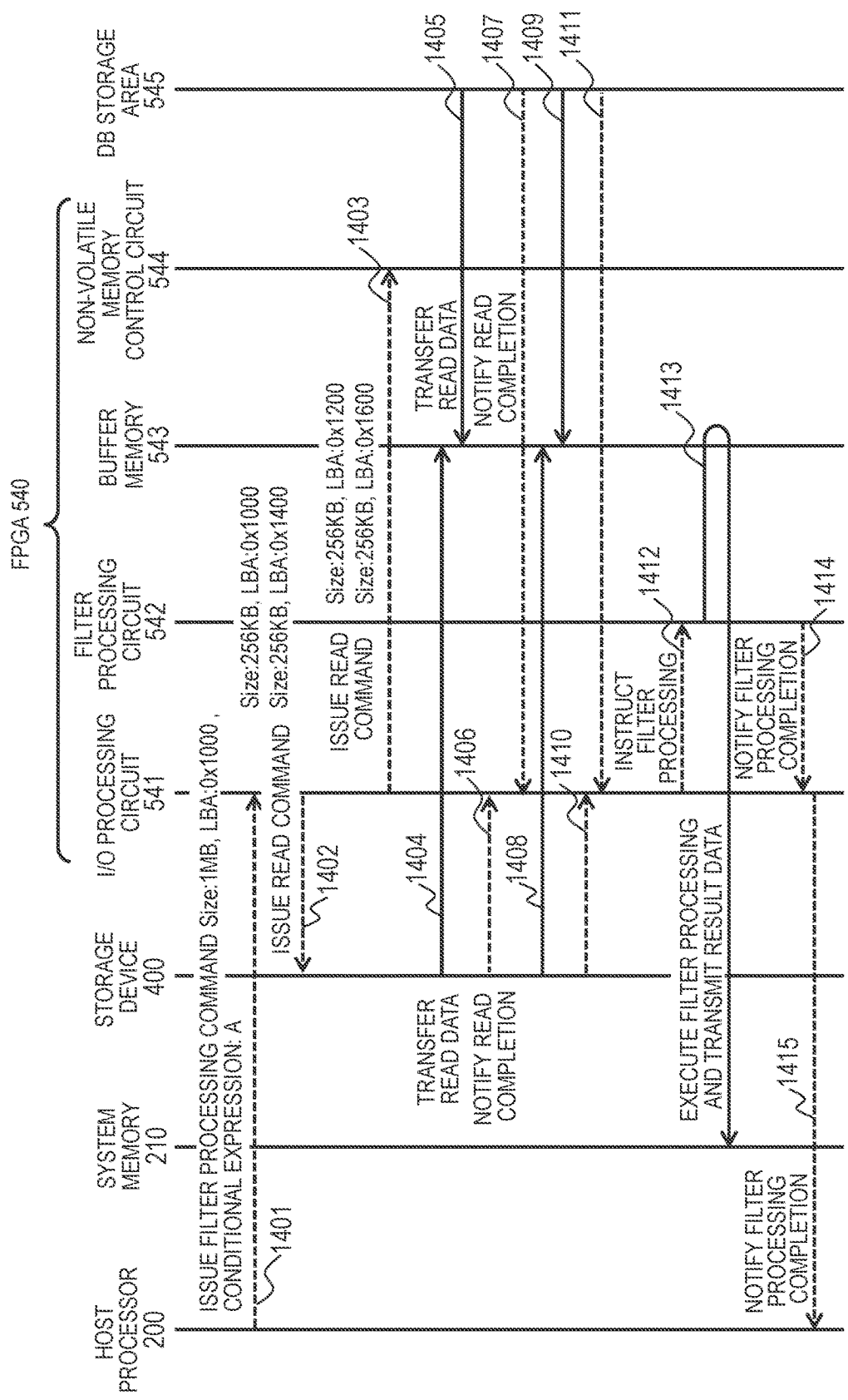
FIG. 18 is a sequence diagram for illustrating an example of database processing to be performed in the information processing apparatus according to the second embodiment of this invention.

FIG. 18 is a sequence diagram for illustrating an example of database processing to be performed in the information processing apparatus 10.

Similarly to FIG. 5 of the first embodiment, the host processor 200, which executes the DBMS 120, issues a filter processing command to the FPGA 540 (1401). The filter processing command at least contains information on which address of the DB storage area 404 of the storage device 400 indicates the top of a table of the database 450 to be subjected to the filter processing, information on the size of the DB 450 to be subjected to the filter processing, and a conditional expression A of the filter processing. An I/O processing circuit 541, which has received the filter processing command, issues a read command to the storage device 400 for data in an LBA area that is not present in the DB storage area 545 (1402). The storage device 400 reads required data and writes that data into a buffer memory 543 (1404 and 1408), and issues a read completion notification to the I/O processing circuit 541 (1406 and 1410).

Meanwhile, the I/O processing circuit 541 issues a read command to a non-volatile memory control circuit 544 for data in an LBA area stored in the DB storage area 545 of the FPGA 540 (1403). The DB storage area 545 reads required data and writes that data into the buffer memory 543 (1405 and 1409), and issues a read completion notification to the I/O processing circuit 541 (1407 and 1411).

When all the pieces of data necessary for filter processing are written into the buffer memory 543, the I/O processing circuit 541 instructs a filter processing circuit 542 to execute the filter processing based on the received conditional expression A (1412). The filter processing circuit 542 uses data in the buffer memory 543 to execute the filter processing, and writes a result of the filter processing into the system memory 210 of the DB server 20 (1413). Then, the filter processing circuit 542 issues a completion notification of the filter processing to the I/O processing circuit 541 (1414). The I/O processing circuit 541 notifies the host processor 200 of the DB server 20 of the completion notification of the filter processing (1415), and ends the processing.

Through such processing, the DB server 20 can offload, to the FPGA 540 serving as an accelerator of the accelerator board 54, the filter processing for DBs stored in the DB storage area 404 of the storage device 400 and the DB storage area 545 of the accelerator board 54.

Third Embodiment

Figure 19:
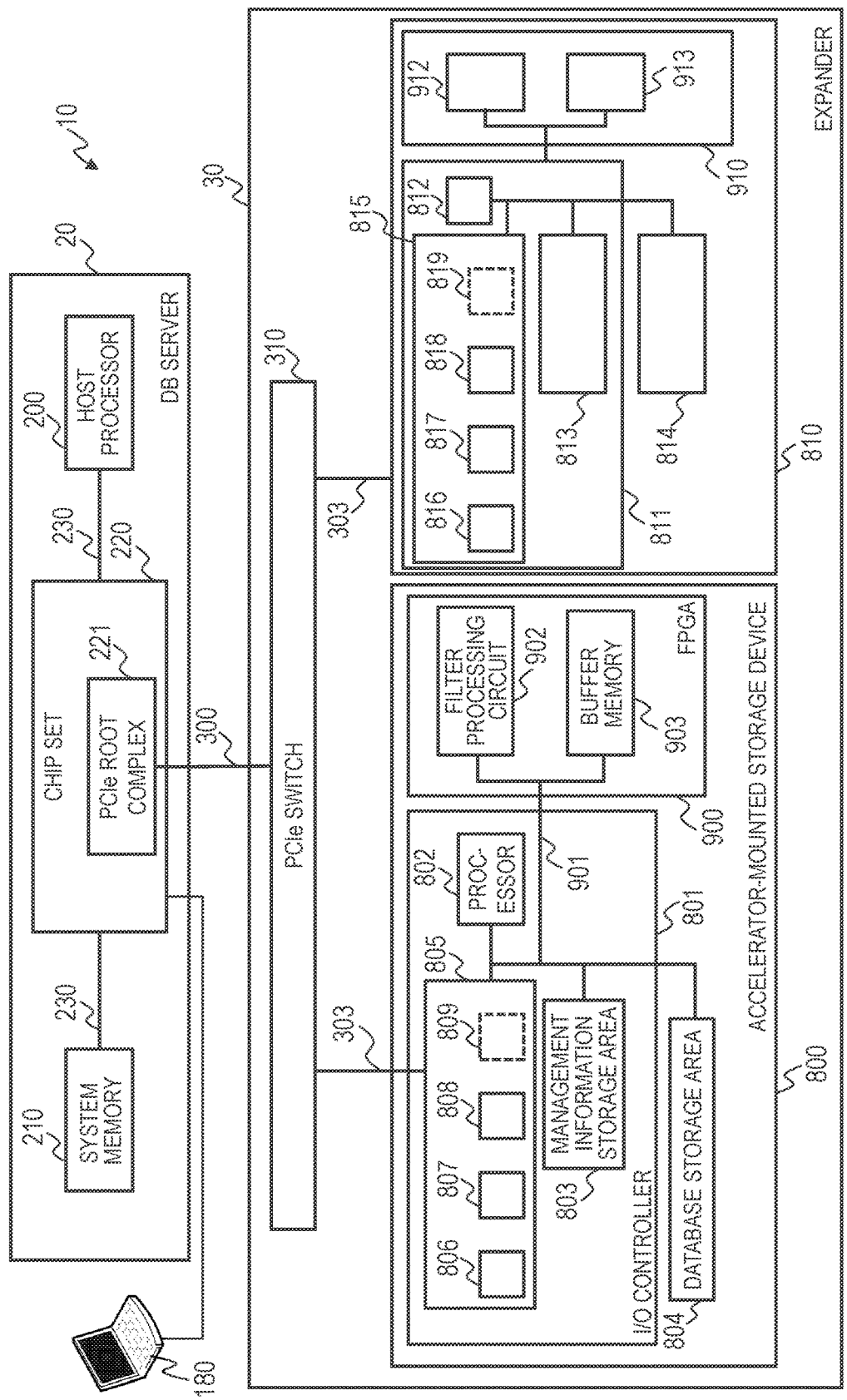
FIG. 19 is an illustration of a third embodiment of this invention, and is a block diagram for illustrating an example of the information processing apparatus.

FIG. 19 is an illustration of a third embodiment of this invention, and is a block diagram for illustrating an example of the information processing apparatus 10. In the third embodiment, in place of the accelerator board 50 and the storage device 400, a plurality of accelerator-mounted storage devices 800 and 810 are connected to the PCIe switch 310. Other configurations are similar to those of the first embodiment.

In the first embodiment, the description given above is based on the example of the accelerator board 50 without a memory element issuing an I/O command to a storage device. However, in this invention, the accelerator-mounted storage devices 800 and 810 having an accelerator function and a storage device function may be adopted.

For example, as can be seen from the information processing apparatus 10 of FIG. 19, a configuration may be employed in which the accelerator-mounted storage device 800 having an FPGA 900 serving as an accelerator mounted thereon and the accelerator-mounted storage device 810 having an FPGA 910 serving as an accelerator mounted thereon are coupled to the DB server 20 via the PCIe switch 310. The DB server 20 and the PCIe switch 310 have configurations similar to those of the first embodiment.

In the accelerator-mounted storage device 800, an I/O controller 801 and the FPGA 900 have an inter-chip communication circuit 901, which enables data of a DB storage area 804 to be transferred to a buffer memory 903 of the FPGA 900. With this, it is possible to perform the filter processing for the DB of the DB storage area 804 using a filter processing circuit 902.

The I/O controller 801 is similar to the I/O controller 401 illustrated in FIG. 2 of the first embodiment, and includes a processor 802, a management information storage area 803, and a command interface 805. The command interface 805 includes an admin queue 806, a processor queue 807, and FPGA queues 808 and 809.

The accelerator-mounted storage device 810 has also a similar configuration, and an I/O controller 801 and the FPGA 910 have an inter-chip communication circuit, which enables data of a DB storage area 814 to be transferred to a buffer memory 913 of the FPGA 910. With this, it is possible to perform the filter processing for the DB of the DB storage area 814 using a filter processing circuit 912.

The I/O controller 811 is similar to the I/O controller 401 illustrated in FIG. 2 of the first embodiment, and includes a processor 812, a management information storage area 813, and a command interface 815. The command interface 815 includes an admin queue 816, a processor queue 817, and FPGA queues 818 and 819.

Figure 20:
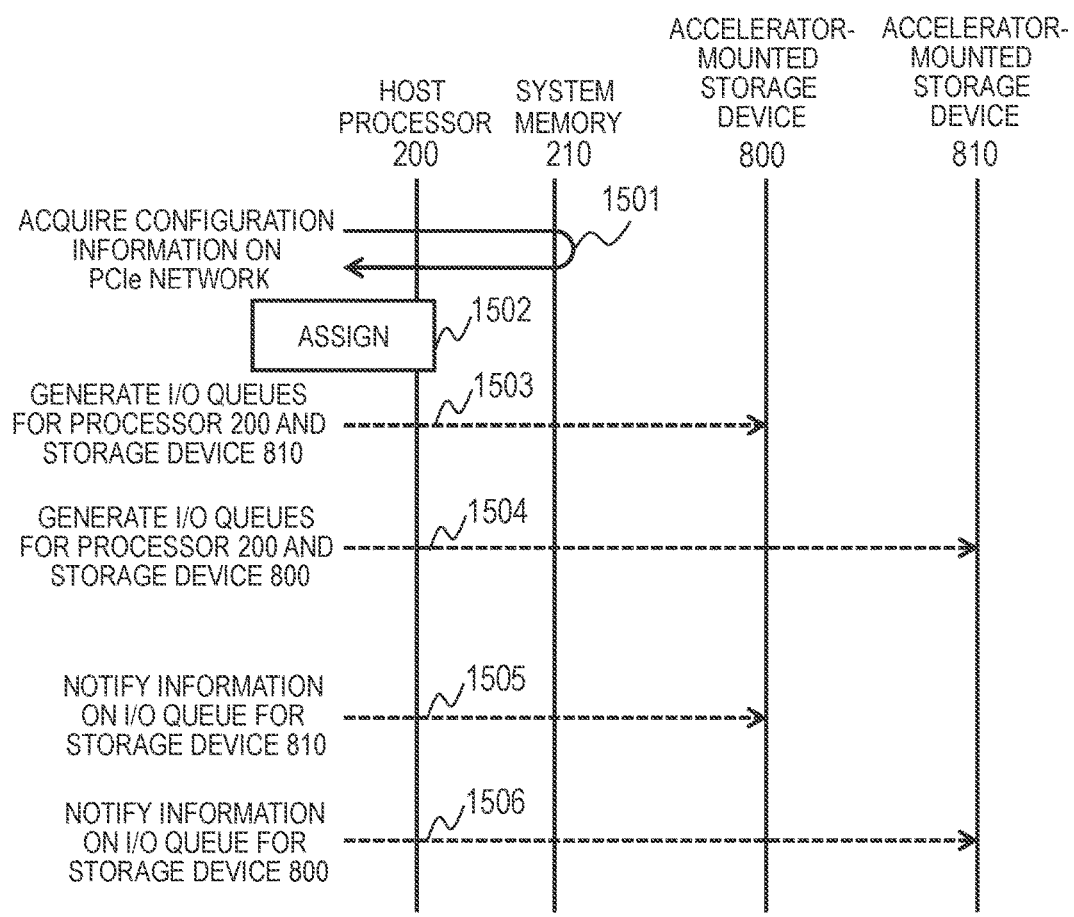
FIG. 20 is a sequence diagram for illustrating an example of initialization processing to be performed in the information processing apparatus according to the third embodiment of this invention.

FIG. 20 is a sequence diagram for illustrating an example of initialization processing to be performed in the information processing apparatus 10.

The host processor 200 acquires configuration information on the PCIe network to which the host processor 200 is coupled from the system memory 210 at the time of initialization of the information processing apparatus 10 (1501).

Next, the host processor 200 uses the acquired configuration information on the PCIe network to assign the database storage areas 804 and 814 to the FPGAs 900 and 910, respectively, for access (1502). This assignment can be performed similarly to FIG. 4 of the first embodiment.

The host processor 200 uses the admin queue 806 of the accelerator-mounted storage device 800 to generate the I/O queue 807 for the host processor 200 and the I/O queue 808 for the FPGA 910 of the accelerator-mounted storage device 810 (1503).

Similarly, the host processor 200 uses the admin queue 816 of the accelerator-mounted storage device 810 to generate the I/O queue 817 for the host processor 200 and the I/O queue 818 for the FPGA 900 of the accelerator-mounted storage device 800 (1504).

After that, the host processor 200 notifies the accelerator-mounted storage device 800 of information on the I/O queue 818 of the accelerator-mounted storage device 810 (1505). Further, the host processor 200 notifies the accelerator-mounted storage device 810 of information on the I/O queue 808 of the accelerator-mounted storage device 800 (1506). Through the processing of FIG. 20, the accelerator-mounted storage device 800 and the accelerator-mounted storage device 810 can issue I/O commands to/from each other, and execute filter processing.

In the third embodiment, an example of implementing the I/O controllers 801 and 811 and the FPGAs 900 and 910 as separate chips is introduced, but those separate chips may be integrated as an I/O controller having an accelerator function by, for example, mounting the filter processing circuits 902 and 912 on the I/O controllers 801 and 811, respectively.

The processing of FIG. 5 of the first embodiment is applied to the third embodiment in the following manner. Specifically, the host processor 200 issues a filter processing command to the accelerator-mounted storage device 810, and the accelerator-mounted storage device 810 reads data from the accelerator-mounted storage device 800. Then, the FPGA 910 of the accelerator-mounted storage device 810 executes filter processing and stores the processing result into the system memory 210 of the host processor 200.

The specifics of FIG. 7, FIG. 8, FIG. 9A, and FIG. 9B of the first embodiment are applied to the third embodiment in the following manner. Specifically, the host processor 200 first collects information on the plurality of accelerator-mounted storage devices 800 and 810 at the time of, for example, activation, and stores the collected information into the system memory 210 as the configuration information on the PCIe network. Then, the host processor 200 determines assignment of the accelerator-mounted storage devices 800 and 810 and the FPGAs 900 and 910 that satisfies a predetermined condition based on the configuration information on the PCIe network. The host processor 200 executes the assignment by notifying the accelerator-mounted storage device 810 of an address of the admin queue 806 of the accelerator-mounted storage device 800 or addresses of the I/O queues 807 and 808 based on the determined assignment.

The processing of FIG. 10 of the first embodiment is applied to the third embodiment in the following manner. Specifically, when a fault has occurred in the accelerator-mounted storage device 800, the host processor 200 detects the fault based on notification from the accelerator-mounted storage device 800. The host processor 200 notifies the accelerator-mounted storage device 810, which executes filter processing, of the fault of the accelerator-mounted storage device 800.

The processing of FIG. 11 of the first embodiment is applied to the third embodiment in the following manner. Specifically, when a fault has occurred in the FPGA 910 of the accelerator-mounted storage device 810, the accelerator-mounted storage device 810 notifies the accelerator-mounted storage device 800, which has read data from the accelerator-mounted storage device 810, of the fault of the FPGA 910.

Alternatively, the accelerator-mounted storage device 810 may notify the host processor 200 of the fault of the FPGA 910, and the host processor 200 may notify the accelerator-mounted storage device 800 of the fault of the FPGA 910.

The processing of FIG. 14 or FIG. 15 of the first embodiment is applied to the third embodiment in the following manner. Specifically, when the host processor 200 detects addition of an accelerator-mounted storage device, the host processor 200 refers to the configuration information on the PCIe network in the system memory 210 and determines assignment of the newly added accelerator-mounted storage device and the FPGA. Then, the host processor 200 notifies the newly added accelerator-mounted storage device and the existing accelerator-mounted storage devices 800 of the addresses of the admin queue and the I/O queue based on the new assignment, to thereby change the assignment.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

<Supplementary Note>

A storage device, which is configured to store data, the storage device including:

an initial setting interface configured to receive an initialization instruction; and an I/O interface configured to issue an I/O command, the I/O interface including:

a first I/O interface configured to receive an I/O command from a first device; and a second I/O interface configured to receive an I/O command from a second device, in which the storage device is capable of receiving the I/O command separately from the first device and the second device.

What is claimed is:

1. An information processing apparatus, comprising:
a processor;
a memory;
at least one accelerator;
at least one storage device; and
a network configured to couple the processor, the at least one accelerator, and the at least one storage device to one another,
wherein the at least one storage device comprises:
an I/O interface configured to receive an I/O command, and
wherein the processor is configured to collect information on at least one storage device and at least one accelerator, which are coupled to the network, and to store the information into the memory as network configuration information,
wherein the processor is configured to derive an assignment of the at least one storage device and the at least one accelerator that satisfies a predetermined condition based on the network configuration information, and
wherein the processor is configured to notify the at least one accelerator of one of an address of an initial setting interface of the at least one storage device and an address of the I/O interface of the at least one storage device based on the derived assignment.

* * * * *